United States Patent
Uchida

(10) Patent No.: US 11,193,436 B2
(45) Date of Patent: Dec. 7, 2021

(54) EVAPORATED FUEL PROCESSING DEVICE

(71) Applicant: HAMANAKODENSO CO., LTD., Kosai (JP)

(72) Inventor: Kimio Uchida, Kariya (JP)

(73) Assignee: HAMANAKODENSO CO., LTD., Kosai (JP)

( * ) Notice: Subject to any disclaimer, the term of this patent is extended or adjusted under 35 U.S.C. 154(b) by 0 days.

(21) Appl. No.: 17/000,548

(22) Filed: Aug. 24, 2020

(65) Prior Publication Data
US 2021/0131363 A1    May 6, 2021

(30) Foreign Application Priority Data
Aug. 28, 2019 (JP) .............................. JP2019-156055

(51) Int. Cl.
| | | |
|---|---|---|
| F02D 41/00 | (2006.01) | |
| F02M 25/08 | (2006.01) | |
| F02M 35/10 | (2006.01) | |
| B01D 53/04 | (2006.01) | |

(52) U.S. Cl.
CPC ....... *F02D 41/004* (2013.01); *B01D 53/0415* (2013.01); *B01D 53/0446* (2013.01); *B01D 53/0454* (2013.01); *F02D 41/0045* (2013.01); *F02M 25/0836* (2013.01); *F02M 25/0872* (2013.01); *F02M 35/10222* (2013.01); *B01D 2253/102* (2013.01); *B01D 2257/702* (2013.01); *B01D 2259/40086* (2013.01); *F02D 2200/0602* (2013.01); *F02D 2200/0614* (2013.01)

(58) Field of Classification Search
CPC .... F02D 41/00; F02D 41/004; F02D 41/0045; F02D 2200/0602; F02D 2200/0614; F02M 25/08; F02M 25/0836; F02M 25/0872; F02M 35/10222; B01D 53/0416; B01D 53/0446; B01D 53/0454; B01D 2253/102; B01D 2257/702; B01D 2259/40086
See application file for complete search history.

(56) References Cited

U.S. PATENT DOCUMENTS

| | | | |
|---|---|---|---|
| 10,012,180 B2* | 7/2018 | Kimoto | ................. F02M 25/08 |
| 11,002,200 B2* | 5/2021 | Miura | ................ F02M 25/0854 |
| 2016/0298577 A1 | 10/2016 | Kimoto et al. | |

FOREIGN PATENT DOCUMENTS

JP    2015-102019    6/2015

* cited by examiner

*Primary Examiner* — Hieu T Vo
(74) *Attorney, Agent, or Firm* — Nixon & Vanderhye P.C.

(57) ABSTRACT

An evaporated fuel processing device is installed to a vehicle having an internal combustion engine and a fuel tank and is configured to process evaporated fuel generated through evaporation of fuel in the fuel tank. A control device of the evaporated fuel processing device is configured to adjust an opening degree of a sealing valve based on a pressure of vapor-phase gas sensed with a pressure sensor and a concentration of evaporated fuel in the vapor-phase gas sensed with a concentration sensor and thereby adjust a supply amount of the evaporated fuel supplied to an air intake pipe at a time of executing a purge operation, in which the vapor-phase gas is purged from the fuel tank to the air intake pipe of the internal combustion engine.

8 Claims, 13 Drawing Sheets

EVAPORATED FUEL PROCESSING DEVICE

CROSS REFERENCE TO RELATED APPLICATION

This application is based on and incorporates herein by reference Japanese Patent Application No. 2019-156055 filed on Aug. 28, 2019.

TECHNICAL FIELD

The present disclosure relates to an evaporated fuel processing device installed in a vehicle.

BACKGROUND

In a vehicle having an internal combustion engine, fuel, which is in a liquid state and is used in a combustion operation of the internal combustion engine, is stored in a fuel tank. In the fuel tank, a pressure is exerted by, for example, a vapor pressure of evaporated fuel according to the temperature. When the fuel is supplied to the fuel tank, it is sometimes desired that the evaporated fuel is not released to the outside of the fuel tank. In such a case, an evaporated fuel processing device, which includes a canister for adsorbing the evaporated fuel, is used.

A sealing valve, which is installed in a vapor pipe connecting between the fuel tank and the canister, is opened before the time of starting the supply of the fuel to the fuel tank, so that the evaporated fuel contained in the fuel tank is adsorbed to an adsorbent of the canister. The fuel components, which are adsorbed to the adsorbent of the canister, are supplied to an air intake pipe of the internal combustion engine and are used in the combustion operation of the internal combustion engine. Furthermore, the evaporated fuel contained in the fuel tank may be supplied to the air intake pipe of the internal combustion engine while bypassing the canister.

SUMMARY

According to the present disclosure, there is provided an evaporated fuel processing device configured to be installed to a vehicle having an internal combustion engine and a fuel tank and process evaporated fuel generated through evaporation of fuel in the fuel tank. The evaporated fuel processing device includes:

a canister that includes an adsorbent, which is configured to adsorb the evaporated fuel;

a sealing valve that is installed in a vapor pipe, which extends from the fuel tank to the canister, wherein the sealing valve is configured to open and close the vapor pipe, and the sealing valve is configured to be driven by an actuator to quantitatively adjust an opening degree of the sealing valve to adjust an opening degree of the vapor pipe;

a pressure sensor that is installed at the fuel tank and is configured to sense a pressure of vapor-phase gas in the fuel tank; and a purge valve that is installed in a purge pipe, which extends from the canister to an air intake pipe of the internal combustion engine, wherein the purge valve is configured to open and close the purge pipe.

According to one aspect of the present disclosure, the evaporated fuel processing device may further include:

a concentration sensor that is installed to one of the fuel tank, the vapor pipe, the canister or the purge pipe, wherein the concentration sensor is configured to sense a concentration of the evaporated fuel in the vapor-phase gas; and at least one controller that is configured to execute:
a sealing operation, in which the at least one controller closes the sealing valve to close the vapor pipe and thereby seal the fuel tank; and
a purge operation, in which the at least one controller opens the sealing valve to open the vapor pipe and opens the purge valve to open the purge pipe, so that the vapor-phase gas in the fuel tank is purged to the air intake pipe while bypassing the adsorbent of the canister, wherein:
the at least one controller is configured to adjust the opening degree of the sealing valve by controlling the actuator based on the pressure of the vapor-phase gas sensed with the pressure sensor and the concentration of the evaporated fuel in the vapor-phase gas sensed with the concentration sensor and thereby adjust a supply amount of the evaporated fuel supplied to the air intake pipe at a time of executing the purge operation.

According to another aspect of the present disclosure, the evaporated fuel processing device may further include:

a flowmeter that is installed to one of the fuel tank, the vapor pipe, the canister or the purge pipe, wherein the flowmeter is configured to sense a flow rate of the vapor-phase gas in the one of the fuel tank, the vapor pipe, the canister or the purge pipe; and at least one controller that is configured to execute:
a sealing operation, in which the at least one controller closes the sealing valve to close the vapor pipe and thereby seal the fuel tank; and
a purge operation, in which the at least one controller opens the sealing valve to open the vapor pipe and opens the purge valve to open the purge pipe, so that the vapor-phase gas in the fuel tank is purged to the air intake pipe while bypassing the adsorbent of the canister, wherein:
the at least one controller is configured to adjust the opening degree of the sealing valve by controlling the actuator based on the pressure of the vapor-phase gas sensed with the pressure sensor and the flow rate of the vapor-phase gas sensed with the flowmeter and thereby adjust a supply amount of the evaporated fuel supplied to the air intake pipe at a time of executing the purge operation.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
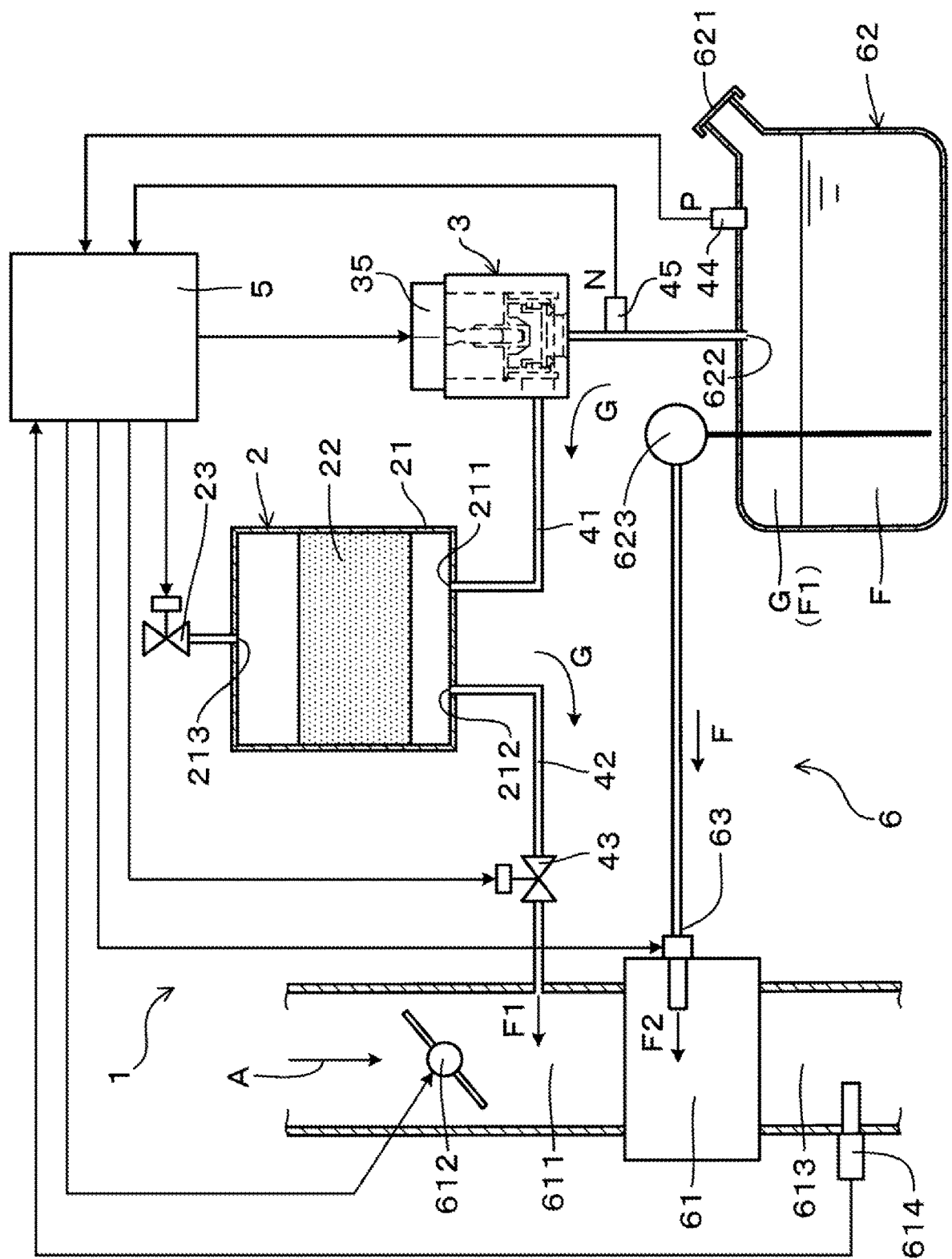
FIG. 1 is a descriptive diagram indicating a portion of a vehicle, at which an evaporated fuel processing device of a first embodiment is installed.

In a vehicle having an internal combustion engine, fuel, which is in a liquid state and is used in a combustion operation of the internal combustion engine, is stored in a fuel tank. In the fuel tank, a pressure is exerted by, for example, a vapor pressure of evaporated fuel according to the temperature. When the fuel is supplied to the fuel tank, it is sometimes desired that the evaporated fuel is not released to the outside of the fuel tank. In such a case, an evaporated fuel processing device, which includes a canister for adsorbing the evaporated fuel, is used.

A sealing valve, which is installed in a vapor pipe connecting between the fuel tank and the canister, is opened before the time of starting the supply of the fuel to the fuel tank, so that the evaporated fuel contained in the fuel tank is adsorbed to an adsorbent of the canister. The fuel components, which are adsorbed to the adsorbent of the canister, are supplied to an air intake pipe of the internal combustion engine and are used in the combustion operation of the internal combustion engine. Furthermore, the evaporated fuel contained in the fuel tank may be supplied to the air intake pipe of the internal combustion engine while bypassing the canister.

The sealing valve, which is used in the evaporated fuel processing device, normally closes the vapor pipe, which connects between the fuel tank and the canister. In contrast, when a signal is outputted from a control device to an actuator of the sealing valve, the sealing valve is opened to open the vapor pipe. An opening and closing operation of the sealing valve for opening and closing the vapor pipe may be executed in, for example, a case where the opening degree of the sealing valve is not adjusted, a case where the opening degree of the sealing valve is adjusted in, for example, two steps, and a case where the opening degree of the sealing valve is quantitatively adjusted.

For example, there has been proposed an evaporated fuel processing device that quantitatively adjusts the opening degree of the sealing valve by using a stepping motor. In this evaporated fuel processing device, at the time of releasing the pressure of the fuel tank, the amount of stroke of a shutoff valve, which serve as the sealing valve, is changed, so that a flow rate of gas, which flows from the fuel tank to a purge pipe connected to the canister, is adjusted. Furthermore, at the time of releasing the pressure of the fuel tank, when the air-fuel ratio of the internal combustion engine becomes rich, a predetermined value is subtracted from the reference stroke amount or the addition stroke amount of the shutoff valve (the sealing valve) to obtain the subtraction stroke amount, and the shutoff valve is opened based on the subtraction stroke amount.

Gasoline, which is used as the fuel of the internal combustion engine, has a high volatility and contains a mixture of many types of hydrocarbons (also referred to as fuel components or simply referred to as components) having, for example, 4 to 12 carbon atoms. The hydrocarbons include many types of hydrocarbons (components) having different volatilities ranging from high-volatility hydrocarbons to low-volatility hydrocarbons (high-volatility components to low-volatility components). Immediately after the fuel is supplied to the fuel tank, the fuel in the liquid phase contained in the fuel tank has a high ratio of the high volatility components, so that a component concentration of the evaporated fuel in the gas contained in the fuel tank is high.

In the vehicle having the internal combustion engine, the sealing valve of the fuel tank is opened every time the pressure in the fuel tank is increased, so that the vapor-phase gas contained in the fuel tank is purged to the air intake pipe of the internal combustion engine. Thus, among the hydrocarbons contained in the fuel (liquid phase) in the fuel tank, the content of the high-volatility hydrocarbons (high-volatility components) is progressively reduced first. Therefore, among the hydrocarbons in the liquid phase, a ratio of the low-volatility hydrocarbons is increased with time. Thus, a ratio of the evaporated low-volatility hydrocarbons (evaporated low-volatility components) in the vapor-phase gas G is increased in the fuel tank with time.

As a result, the concentration of the evaporated fuel contained in the vapor-phase gas is changed with time, and the supply amount of the evaporated fuel, which is purged from the fuel tank to the air intake pipe of the internal combustion engine, is changed. Then, at the time of controlling the air-fuel ratio of the internal combustion engine, a ratio between the supply amount of fuel (hereinafter referred to as injection fuel) injected from fuel injection devices of the internal combustion engine and the supply amount of the evaporated fuel is changed. Thus, in the control operation of the air-fuel ratio of the internal combustion engine, which is executed based on the feedback of the air-fuel ratio of the exhaust gas sensed with a gas sensor, the time, which is required to adjust the air-fuel ratio to the target air-fuel ratio in the control operation of the air-fuel ratio of the internal combustion engine, is increased.

In the evaporated fuel processing device discussed above, the concentration of the evaporated fuel is not taken into account at the time of purging the vapor-phase gas, which is contained in the fuel tank, to the internal combustion engine.

Therefore, when the evaporated fuel is mixed into the injection fuel at the internal combustion engine, the air-fuel ratio of the internal combustion engine once changes. The supply amount of the injection fuel is adjusted by the control device after this change in the air-fuel ratio is fed back from the air-fuel ratio sensor to the control device. Thus, the time, which is required by the control device to adjust the air-fuel ratio of the internal combustion engine to the target air-fuel ratio, is disadvantageously increased.

According to one aspect of the present disclosure, there is provided an evaporated fuel processing device configured to be installed to a vehicle having an internal combustion engine and a fuel tank and process evaporated fuel generated through evaporation of fuel in the fuel tank, comprising:

a canister that includes an adsorbent, which is configured to adsorb the evaporated fuel;

a sealing valve that is installed in a vapor pipe, which extends from the fuel tank to the canister, wherein the sealing valve is configured to open and close the vapor pipe, and the sealing valve is configured to be driven by an actuator to quantitatively adjust an opening degree of the sealing valve to adjust an opening degree of the the vapor pipe;

a pressure sensor that is installed at the fuel tank and is configured to sense a pressure of vapor-phase gas in the fuel tank;

a purge valve that is installed in a purge pipe, which extends from the canister to an air intake pipe of the internal combustion engine, wherein the purge valve is configured to open and close the purge pipe;

a concentration sensor that is installed to one of the fuel tank, the vapor pipe, the canister or the purge pipe, wherein the concentration sensor is configured to sense a concentration of the evaporated fuel in the vapor-phase gas; and at least one controller that is configured to execute:
a sealing operation, in which the at least one controller closes the sealing valve to close the vapor pipe and thereby seal the fuel tank; and
a purge operation, in which the at least one controller opens the sealing valve to open the vapor pipe and opens the purge valve to open the purge pipe, so that the vapor-phase gas in the fuel tank is purged to the air intake pipe while bypassing the adsorbent of the canister, wherein:
the at least one controller is configured to adjust the opening degree of the sealing valve by controlling the actuator based on the pressure of the vapor-phase gas sensed with the pressure sensor and the concentration of the evaporated fuel in the vapor-phase gas sensed with the concentration sensor and thereby adjust a supply amount of the evaporated fuel supplied to the air intake pipe at a time of executing the purge operation.

According to another aspect of the present disclosure, there is provided an evaporated fuel processing device configured to be installed to a vehicle having an internal combustion engine and a fuel tank and process evaporated fuel generated through evaporation of fuel in the fuel tank, comprising:

a canister that includes an adsorbent, which is configured to adsorb the evaporated fuel;

a sealing valve that is installed in a vapor pipe, which extends from the fuel tank to the canister, wherein the sealing valve is configured to open and close the vapor pipe, and the sealing valve is configured to be driven by an actuator to quantitatively adjust an opening degree of the sealing valve to adjust an opening degree of the the vapor pipe;

a pressure sensor that is installed at the fuel tank and is configured to sense a pressure of vapor-phase gas in the fuel tank;

a purge valve that is installed in a purge pipe, which extends from the canister to an air intake pipe of the internal combustion engine, wherein the purge valve is configured to open and close the purge pipe;

a flowmeter that is installed to one of the fuel tank, the vapor pipe, the canister or the purge pipe, wherein the flowmeter is configured to sense a flow rate of the vapor-phase gas in the one of the fuel tank, the vapor pipe, the canister or the purge pipe; and at least one controller that is configured to execute:
a sealing operation, in which the at least one controller closes the sealing valve to close the vapor pipe and thereby seal the fuel tank; and
a purge operation, in which the at least one controller opens the sealing valve to open the vapor pipe and opens the purge valve to open the purge pipe, so that the vapor-phase gas in the fuel tank is purged to the air intake pipe while bypassing the adsorbent of the canister, wherein:
the at least one controller is configured to adjust the opening degree of the sealing valve by controlling the actuator based on the pressure of the vapor-phase gas sensed with the pressure sensor and the flow rate of the vapor-phase gas sensed with the flowmeter and thereby adjust a supply amount of the evaporated fuel supplied to the air intake pipe at a time of executing the purge operation.

(Evaporated Fuel Processing Device According to One Aspect)

The at least one controller of the evaporated fuel processing device according to the one aspect of the present disclosure is configured to adjust the opening degree of the sealing valve based not only on the pressure of the vapor-phase gas sensed with the pressure sensor but also on the concentration of the evaporated fuel in the vapor-phase gas sensed with the concentration sensor and thereby adjust the supply amount of the evaporated fuel supplied to the air intake pipe at the time of executing the purge operation, in which the vapor-phase gas is purged from the fuel tank to the air intake pipe of the internal combustion engine. When the concentration of the evaporated fuel is known, the amount of substance, which is the supply amount of the evaporated fuel, is sensed, and this amount of substance is adjusted.

Thereby, when the evaporated fuel in the vapor-phase gas contained in the fuel tank is purged to the air intake pipe of the internal combustion engine in the purge operation, the supply amount of the injection fuel supplied from at least one fuel injection device to the internal combustion engine is determined by taking into account the supply amount of the evaporated fuel. Therefore, the at least one controller can reduce the supply amount of the injection fuel by the amount that corresponds to the supply amount of the evaporated fuel, which serves as feedforward, before the time of receiving the feedback of the air-fuel ratio from, for example, the air-fuel ratio sensor at the time of controlling the air-fuel ratio of the internal combustion engine. As a result, when the feedback control operation of the air-fuel ratio of the internal combustion engine is executed by the at least one controller, it is possible to avoid that a change in the concentration of the evaporated fuel acts as a disturbance.

Therefore, in the evaporated fuel processing device according to the one aspect of the present disclosure, even when the purge operation is performed, the time, which is required to adjust the air-fuel ratio of the internal combustion engine to the target air-fuel ratio, is reduced.

(Evaporated Fuel Processing Device According to Another Aspect)

The at least one controller of the evaporated fuel processing device according to the another aspect of the present disclosure is configured to adjust the opening degree of the sealing valve based not only on the pressure of the vapor-phase gas sensed with the pressure sensor but also on the flow rate of the evaporated fuel sensed with the flowmeter and thereby adjust the supply amount of the evaporated fuel supplied to the air intake pipe at the time of executing the purge operation, in which the vapor-phase gas is purged from the fuel tank to the air intake pipe of the internal combustion engine. When the flow rate of the vapor-phase gas is known, the amount of substance, which is the supply amount of the evaporated fuel per unit time, is sensed, and this amount of substance is adjusted.

In this way, when the evaporated fuel in the vapor-phase gas contained in the fuel tank is purged to the air intake pipe of the internal combustion engine in the purge operation, the supply amount of the injection fuel supplied from at least one fuel injection device to the internal combustion engine is determined by taking into account the supply amount of the evaporated fuel. Therefore, the at least one controller can reduce the supply amount of the injection fuel by the amount that corresponds to the supply amount of the evaporated fuel, which serves as feedforward, before the time of receiving the feedback of the air-fuel ratio from, for example, the air-fuel ratio sensor at the time of controlling the air-fuel ratio of the internal combustion engine. As a result, when the feedback control operation of the air-fuel ratio of the internal combustion engine is executed by the at least one controller, it is possible to avoid that a change in the concentration of the evaporated fuel acts as a disturbance.

Therefore, in the evaporated fuel processing device according to the another aspect of the present disclosure, even when the purge operation is performed, the time, which is required to adjust the air-fuel ratio of the internal combustion engine to the target air-fuel ratio, is reduced.

The at least one controller described above may be a single controller or a plurality of controllers depending on a need.

Hereinafter, embodiments of an evaporated fuel processing device will be described with reference to the drawings.

First Embodiment

As shown in FIG. 1, the evaporated fuel processing device 1 of the present embodiment is installed to a vehicle 6 having an internal combustion engine 61 and a fuel tank 62 and is configured to process evaporated fuel F1 generated through evaporation of fuel F in the fuel tank 62. The evaporated fuel processing device 1 includes a canister 2, a vapor pipe 41, a sealing valve 3, a pressure sensor 44, a purge pipe 42, a purge valve 43, a concentration sensor 45 and a control device 5.

The canister 2 includes an adsorbent 22 that is configured to adsorb the evaporated fuel F1. The vapor pipe 41 extends from the fuel tank 62 to the canister 2. The sealing valve 3 is installed in the vapor pipe 41 and is configured to open and close the vapor pipe 41, and the sealing valve 3 is configured to be driven by a stepping motor (actuator) 35 to quantitatively adjust an opening degree of the sealing valve 3 to adjust an opening degree of the vapor pipe 41. The pressure sensor 44 is installed at the fuel tank 62 and is configured to sense a pressure P1 of the vapor-phase gas G in the fuel tank 62.

The purge pipe 42 extends from the canister 2 to an air intake pipe (or simply referred to as an intake pipe) 611 of the internal combustion engine 61. The purge valve 43 is installed in the purge pipe 42 and is configured to open and close the purge pipe 42. The concentration sensor 45 is installed in the vapor pipe 41 and is configured to sense a concentration N of the evaporated fuel F1 in the vapor-phase gas G.

The control device 5 serves as a controller and may be in a form of, for example, a microcomputer that includes a processor (e.g., a CPU) and memories (e.g., a RAM, a ROM). The control device 5 is configured to execute a sealing operation, a vapor operation 501, a canister purge operation 502 and a purge operation 503. The sealing operation is an operation, in which the control device 5 closes the sealing valve 3 to close the vapor pipe 41 and thereby seal the fuel tank 62. The vapor operation 501 is an operation, in which the control device 5 opens the sealing valve 3 to open the vapor pipe 41 to purge the vapor-phase gas G contained in the fuel tank 62 to the canister 2. The canister purge operation 502 is an operation, in which the control device 5 opens the purge valve 43 to open the purge pipe 42 and thereby to purge fuel components contained in the canister 2 to the air intake pipe 611. The purge operation 503 is an operation, in which the control device 5 opens the sealing valve 3 to open the vapor pipe 41 and opens the purge valve 43 to open the purge pipe 42, so that the vapor-phase gas G in the fuel tank 62 is purged to the air intake pipe 611 while bypassing the canister 2 (more specifically the adsorbent 22 of the canister 2).

Figure 2:
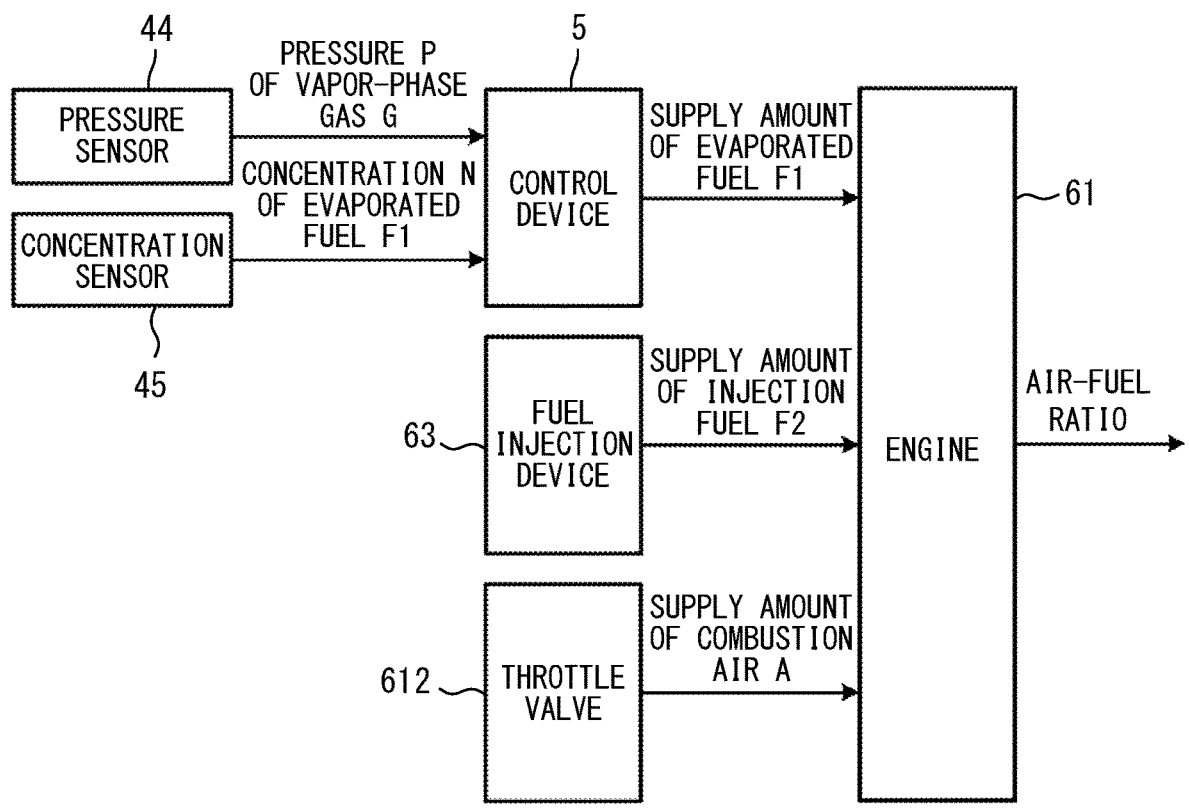
FIG. 2 is a descriptive diagram indicating a process of determining an air-fuel ratio of an internal combustion engine based on a supply amount of evaporated fuel and a supply amount of injection fuel according to the first embodiment.

As shown in FIG. 2, the control device 5 is configured to adjust the opening degree of the sealing valve 3 based on a pressure P of the vapor-phase gas G sensed with the pressure sensor 44 and a concentration N of the evaporated fuel F1 in the vapor-phase gas G sensed with the concentration sensor 45 and thereby adjust a supply amount of the evaporated fuel F1 supplied to the air intake pipe 611 at the time of executing the purge operation 503.

Hereinafter, the evaporated fuel processing device 1 of the present embodiment will be described in detail.

(Evaporated Fuel Processing Device 1)

As shown in FIG. 1, in the vehicle 6, the evaporated fuel processing device 1 is used to limit release of the evaporated fuel F1 contained in the vapor-phase gas G in the fuel tank 62 to the atmosphere at the time of refueling, i.e., supplying the fuel F to the fuel tank 62. The evaporated fuel F1 in the fuel tank 62 is released to the air intake pipe 611 of the internal combustion engine 61 after being accumulated in the canister 2 or is released to the air intake pipe 611 of the internal combustion engine 61 while bypassing the canister 2 (more specifically the adsorbent 22 of the canister 2). Fuel components of the evaporated fuel F1 are used in the combustion at the internal combustion engine 61.

A flow rate of the combustion air A, which is supplied from the air intake pipe 611 to the internal combustion engine 61, is adjusted through an operation of a throttle valve 612 installed in the air intake pipe 611. Fuel injection devices (also referred to as fuel injectors) 63, which inject the fuel F supplied from the fuel tank 62, are installed at the internal combustion engine 61.

(Fuel Tank 62)

As shown in FIG. 1, the fuel tank 62 is configured to store the fuel F to be used at the combustion operation of the internal combustion engine 61. The fuel tank 62 has: a fuel supply port 621, through which the fuel F is supplied from an outside into an inside of the fuel tank 62; a purge port 622, which is connected to the vapor pipe 41; and a fuel pump 623, which is used to feed the fuel F to the fuel injection devices 63 of the internal combustion engine 61.

A cap is installed to the fuel supply port 621 such that the cap normally closes the fuel supply port 621 and opens the fuel supply port 621 at the time of supplying the fuel to the fuel tank 62. A sensor, which is configured to sense the pressure P of the vapor-phase gas G in the fuel tank 62 to terminate the supply of the fuel to the fuel tank 62 through a refueling nozzle, is installed to the fuel tank 62. The fuel pump 623 is configured to feed the fuel in a liquid phase received in the fuel tank 62 to the fuel injection devices 63.

(Canister 2)

As shown in FIG. 1, the canister 2 includes a case 21 and the adsorbent 22 while the adsorbent 22 is placed at an inside of the case 21. The adsorbent 22 is, for example, activated carbon and adsorbs evaporated fuel (vaporized fuel) F1. The case 21 of the canister 2 has: an inlet 211 of the vapor-phase gas G connected to the vapor pipe 41; an outlet 212 of the fuel components connected to the purge pipe 42; and a pressure release opening 213 that can be opened to the atmosphere. An on-off valve 23, which is configured to open and close the pressure release opening 213, is installed at the pressure release opening 213. At the time of purging (discharging) the vapor-phase gas G from the fuel tank 62 to the canister 2, the on-off valve 23 opens the pressure release opening 213 to the atmosphere. At the canister 2, the fuel components of the evaporated fuel F1 in the vapor-phase gas G are adsorbed to the adsorbent 22, and the pressure in the inside of the canister 2 is kept to be substantially equal to the atmospheric pressure.

The fuel components, which are adsorbed to the adsorbent 22 of the canister 2, are released to the air intake pipe 611 of the internal combustion engine 61 through the purge pipe 42. At this time, the pressure release opening 213 of the canister 2 is opened to the atmosphere, and the purge valve 43 is opened to open the purge pipe 42. The fuel components, which are adsorbed to the adsorbent 22, are released to the air intake pipe 611 of the internal combustion engine 61 by a flow of the air that is generated by a differential pressure between the pressure of the atmosphere supplied into the inside of the canister 2 through the pressure release opening 213 and a negative pressure generated in the air intake pipe 611.

(Sealing Valve 3)

Figure 3:
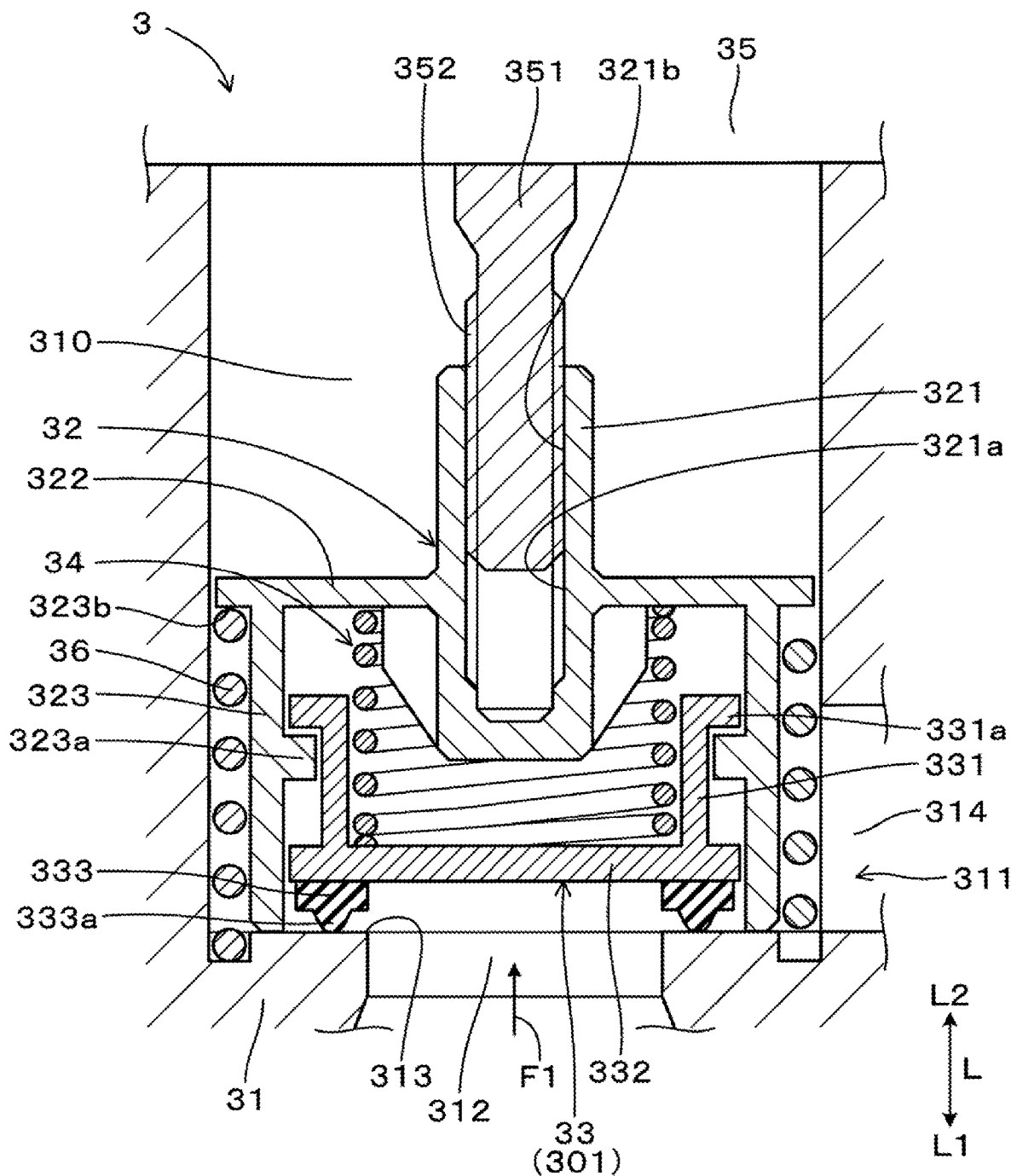
FIG. 3 is a descriptive diagram indicating a sealing valve held in a closing position at the evaporated fuel processing device according to the first embodiment.
Figure 4:
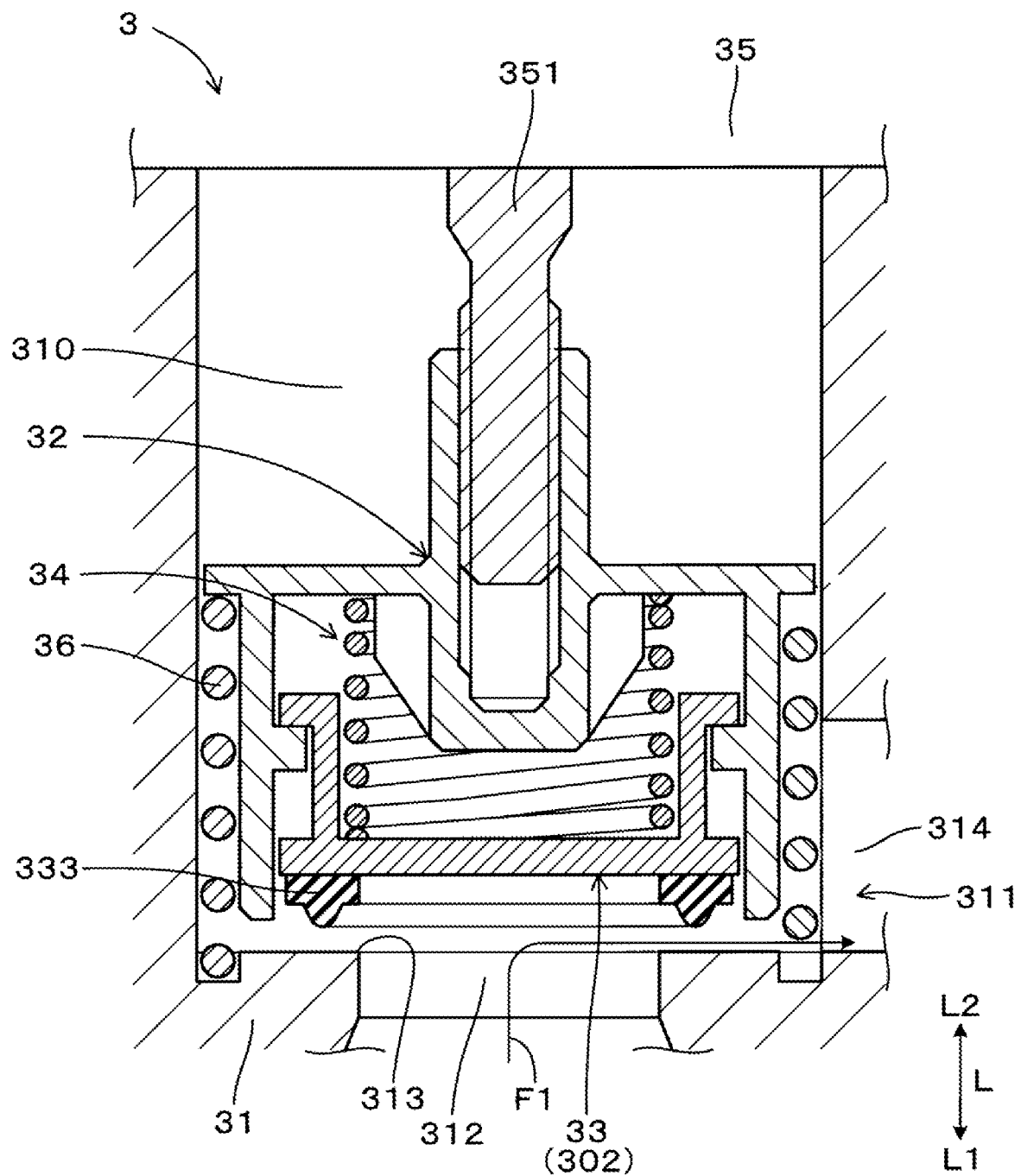
FIG. 4 is a descriptive diagram indicating the sealing valve held in an opening position at the evaporated fuel processing device according to the first embodiment.

As shown in FIGS. 3 and 4, the sealing valve 3 of the present embodiment includes a housing 31, a valve guide 32, a valve 33, a valve-side spring 34, a stepping motor 35 and a guide-side spring 36. The housing 31 forms a case of the sealing valve 3 and has a sealing flow passage 311 that is connected to the vapor pipe 41. The valve guide 32 converts a rotational force of the stepping motor 35 into a propulsive force such that the valve guide 32 is moved forward or backward relative to the housing 31 by the propulsive force. The valve 33 is slidably engaged to the valve guide 32 and is configured to open and close the sealing flow passage 311 of the housing 31.

The valve-side spring 34 is clamped between the valve guide 32 and the valve 33 and urges the valve 33 in a closing direction that is a direction for closing the sealing flow passage 311 with the valve 33. The guide-side spring 36 is placed on a radially outer side of the valve guide 32 and is configured to reduce backlash generated between an output shaft 351 of the stepping motor 35 and the valve guide 32.

(Housing 31)

As shown in FIGS. 3 and 4, the housing 31 includes: a receiving hole 310, which receives the valve guide 32; and the sealing flow passage 311, which is communicated with the receiving hole 310. The receiving hole 310 extends from a proximal end side L2 of the housing 31, which is one side in the axial direction L. The sealing flow passage 311 includes: a flow inlet 312, which is connected to the fuel tank 62 and inputs the vapor-phase gas G into the inside of the sealing flow passage 311; and a flow outlet 314, which outputs the vapor-phase gas G from the inside of the sealing flow passage 311 toward the canister 2. The flow inlet 312 extends in parallel with the receiving hole 310 at a distal end side L1 of the receiving hole 310, which is the other side in the axial direction L, and the flow outlet 314 extends perpendicular to the receiving hole 310.

(Axial Direction L)

The axial direction L is a direction that is parallel to the opening and closing direction of the valve 33 that is the direction for opening and closing the sealing flow passage 311 with the valve 33. In the axial direction L of the sealing valve 3, the proximal end side L2 is the one side, at which the stepping motor 35 is placed, and the distal end side L1 is the other side, at which the sealing flow passage 311 is closed with the valve 33.

(Valve Guide 32)

As shown in FIGS. 3 and 4, the valve guide 32 includes a center shaft portion 321, a guide disk portion 322, a guide tubular portion 323 and a retaining portion 323a. The center shaft portion 321 is threadably engaged with the output shaft 351 of the stepping motor 35. The guide disk portion 322 is shaped in a circular disk plate form and radially outwardly projects from an outer peripheral surface of the center shaft portion 321. The guide tubular portion 323 is shaped in a cylindrical tubular form and axially projects from an outer peripheral part of the guide disk portion 322 toward the distal end side L1. The retaining portion 323a is formed along an inner peripheral surface of the guide tubular portion 323 and is configured to retain the valve 33. A male thread 352 is formed along an outer peripheral surface of the output shaft 351 of the stepping motor 35. A hollow hole 321a is formed at a center of the center shaft portion 321 of the valve guide 32, and a female thread 321b, which is threadably engaged with the male thread 352 of the output shaft 351 of the stepping motor 35, is formed at an inner peripheral surface of the hollow hole 321a. The retaining portion 323a is formed by a projection, which radially inwardly projects from the inner peripheral surface of the guide tubular portion 323. A main body of the stepping motor 35 is fixed to the housing 31.

(Valve 33)

As shown in FIGS. 3 and 4, the valve 33 includes a valve tubular portion 331, a valve closing plate portion 332 and a sealing material 333. The valve tubular portion 331 is placed on a radially inner side of the guide tubular portion 323 of the valve guide 32 and has a stopper projection 331a that is configured to be retained by the retaining portion 323a. The valve closing plate portion 332 closes an end part of the valve tubular portion 331, which is located on the distal end side L1 in the axial direction L. The sealing material 333 is shaped in a ring form and is installed to the valve closing plate portion 332 to seal an opening 313 of the flow inlet 312 of the sealing flow passage 311. The valve tubular portion 331 is shaped in a cylindrical tubular form and guides an outer peripheral side of the valve-side spring 34. The stopper projection 331a radially outwardly projects from an end part of the valve tubular portion 331, which is located on the proximal end side L2 in the valve tubular portion 331. The valve closing plate portion 332 and the stopper projection 331a are guided in the axial direction L by an inner peripheral surface of the guide tubular portion 323 of the valve guide 32.

The sealing material 333 is placed at a peripheral part of the opening 313 of the flow inlet 312 of the sealing flow passage 311 at the housing 31. The sealing material 333 has a sealing portion 333a, which is located on the distal end side L1 in the axial direction L and is configured to be resiliently deformed when the sealing portion 333a abuts against the peripheral part of the opening 313 of the flow inlet 312 of the sealing flow passage 311 at the housing 31. A position of a whole circumference of the sealing portion 333a, which is located on the distal end side L1 in the axial direction L, is placed along an imaginary plane that is parallel with a surface of the valve closing plate portion 332, which is located on the proximal end side L2 in the axial direction L.

The valve 33 is urged by the valve-side spring 34 toward the distal end side L1 in the axial direction L. The stopper projection 331a of the valve tubular portion 331 of the valve 33 is retained by the retaining portion 323a of the guide tubular portion 323 of the valve guide 32, so that the valve 33 is retained in the inside of the valve guide 32. The valve 33 is movable between a closing position 301, at which the valve 33 is urged by the urging force of the valve-side spring 34 and closes the sealing flow passage 311 as shown in FIG. 3, and an opening position 302, at which the valve 33 opens the sealing flow passage 311 as shown in FIG. 4 while an opening amount of the sealing flow passage 311 is determined according to a moving amount of the valve guide 32 toward the proximal end side L2 in the axial direction L. The closing position 301 serves as an initial position (normal position) of the valve 33, and the sealing flow passage 311 is closed by the sealing material 333 of the valve 33 in the normal state of the valve 33 in the closing position 301.

As shown in FIG. 3, when the opening 313 of the flow inlet 312 of the sealing flow passage 311 is closed by the sealing portion 333a of the sealing material 333 of the valve 33, the urging force of the valve-side spring 34, which is applied to the valve closing plate portion 332 toward the distal end side L1 in the axial direction L, is larger than a pressure of the vapor-phase gas G in the flow inlet 312, which is applied to the valve closing plate portion 332 toward the proximal end side L2 in the axial direction L. Thereby, the valve 33 is kept in the closing position 301, so that the sealing flow passage 311 is held in the closing state.

In contrast, as shown in FIG. 4, when the stepping motor 35 is driven to move the valve guide 32 toward the proximal end side L2 in the axial direction L to open the opening 313 of the flow inlet 312 of the sealing flow passage 311, the valve 33 and the valve-side spring 34 are also moved along with the valve guide 32 toward the proximal end side L2 in the axial direction L. Then, the sealing portion 333a of the sealing material 333 of the valve 33 is moved away from the peripheral part of the opening 313 of the flow inlet 312 of the sealing flow passage 311 to the opening position 302 at the housing 31, so that the sealing flow passage 311 is opened. Thus, the moving amount of the valve guide 32, the valve 33 and the valve-side spring 34 toward the proximal end side L2 in the axial direction L is determined based on the number of the drive pulses supplied to the stepping motor 35. Thereby, the opening amount (opening degree) of the sealing flow passage 311 is quantitatively determined.

(Valve-Side Spring 34, Guide-Side Spring 36)

As shown in FIGS. 3 and 4, the valve-side spring 34 and the guide-side spring 36 are respectively formed by a compression coil spring (a torsion coil spring), which is formed by spirally winding a round wire (serving as a material wire). The valve-side spring 34 has a function of maintaining the valve 33 in the closing position 301 by applying a predetermined urging force against the valve 33 that is configured to close the sealing flow passage 311. The guide-side spring 36 is placed on the radially outer side of the guide tubular portion 323 of the valve guide 32. The guide-side spring 36 is clamped between a stepped portion 323b of the guide tubular portion 323 and the peripheral part of the opening 313 of the flow inlet 312 of the sealing flow passage 311 of the housing 31.

The valve guide 32 is urged by the guide-side spring 36 toward the proximal end side L2 in the axial direction L, so that a gap between the male thread 352 of the output shaft 351 of the stepping motor 35 and the female thread 321b of the center hole of the center shaft portion 321 of the valve guide 32 is placed on the one side in the axial direction L. In this way, generation of play (backlash) between the output shaft 351 and the valve guide 32 in the axial direction L is limited at the time when the stepping motor 35 rotates the output shaft 351.

(Purge Valve 43)

As shown in FIG. 1, the purge valve 43 is configured to open the purge pipe 42 at the time of purging (discharging) the fuel components, which are adsorbed to the adsorbent 22 of the canister 2, to the air intake pipe 611 of the internal combustion engine 61, and the time of purging (discharging) the vapor-phase gas G of the fuel tank 62 to the air intake pipe 611 of the internal combustion engine 61. The purge valve 43 of the present embodiment has the function of opening and closing the purge pipe 42 through opening and closing of the purge valve 43 that is implemented like switching on and off.

The purge valve 43 repeats the opening and closing of the purge valve 43 based on pulsed energization command signals supplied to the purge valve 43. Alternatively, the purge valve 43 can quantitatively change the opening degree of the purge valve 43 to quantitatively change the opening degree of the purge pipe 42. In this case, the flow rate of the purge gas, which includes the fuel components and flows through the purge valve 43, can be appropriately adjusted in the canister purge operation 502. Furthermore, the purge valve 43 may be formed by a control valve that can quantitatively change the opening degree of the control valve to quantitatively change the opening degree of the purge pipe 42.

(Pressure Sensor 44)

As shown in FIG. 1, the pressure sensor 44 is formed by a pressure meter that is configured to sense the pressure P of the vapor-phase gas G in the fuel tank 62. Most of the pressure P of the vapor-phase gas G in the fuel tank 62 is generated by the vapor pressure of the evaporated fuel F1.

(Concentration Sensor 45)

As shown in FIG. 1, the concentration sensor 45 is configured to sense the concentration N of the evaporated fuel (the hydrocarbon gas) F1 in the vapor-phase gas G contained in the fuel tank 62. The concentration sensor 45 can be referred to as an evaporated fuel concentration sensor and can be constructed by using the characteristics of an oxygen concentration sensor (solid-electrolyte oxygen sensor) that has a solid electrolyte and senses a fuel rich side. The concentration sensor 45 can have any one of various structures that can measure the concentration N of the evaporated fuel F1. The concentration sensor 45 of the present embodiment is installed in the vapor pipe 41 at a corresponding location that is on a side of the sealing valve 3, at which the fuel tank 62 is placed.

The gasoline, which is used as the fuel of the internal combustion engine 61, has a high volatility and is produced as a mixture of various types of hydrocarbons having, for example, 4 to 12 carbon atoms. The hydrocarbons include many types of hydrocarbons (components) having different volatilities ranging from high-volatility hydrocarbons to low-volatility hydrocarbons (high-volatility components to low-volatility components). Immediately after the fuel is supplied to the fuel tank 62, the fuel in the liquid phase contained in the fuel tank 62 has a high ratio of the high volatility components, so that a component concentration of the evaporated fuel F1 in the gas contained in the fuel tank 62 is high.

In the vehicle 6 having the internal combustion engine 61, the sealing valve 3 of the fuel tank 62 is opened through the purge operation 503 of the control device 5 to purge the vapor-phase gas G of the fuel tank 62 to the air intake pipe 611 of the internal combustion engine 61 every time the pressure of the fuel tank 62 increases at the time of, for example, driving the vehicle 6. Thereby, among the hydrocarbons contained in the fuel (liquid phase) in the fuel tank 62, a content of the high-volatility hydrocarbons (high-volatility components) is progressively reduced first. Therefore, among the hydrocarbons in the liquid phase, a ratio of the low-volatility hydrocarbons is increased with time. Thus, a ratio of the evaporated low-volatility hydrocarbons (evaporated low-volatility components) in the vapor-phase gas G is increased in the fuel tank 62 with time.

As a result, the concentration N of the evaporated fuel F1 contained in the vapor-phase gas G is changed with time. If the concentration N of the evaporated fuel F1 is not taken into account, the supply amount of the evaporated fuel F1, which is purged from the fuel tank 62 to the air intake pipe 611 of the internal combustion engine 61, is changed. Furthermore, the vapor-phase gas G may possibly contain, for example, the air besides the evaporated fuel (evaporated gas) F1. In such a case, the concentration N of the evaporated fuel F1 contained in the vapor-phase gas G is reduced. If the concentration N of the evaporated fuel F1 is not taken into account, the supply amount of the evaporated fuel F1, which is purged from the fuel tank 62 to the air intake pipe 611 of the internal combustion engine 61, is changed. In the present embodiment, the concentration N of the evaporated fuel F1 is sensed with the concentration sensor 45, so that the amount of substance of the evaporated fuel F1 (serving as the supply amount of the evaporated fuel F1), which is purged to the air intake pipe 611, can be accurately sensed.

(Control Device 5)

Figure 5:
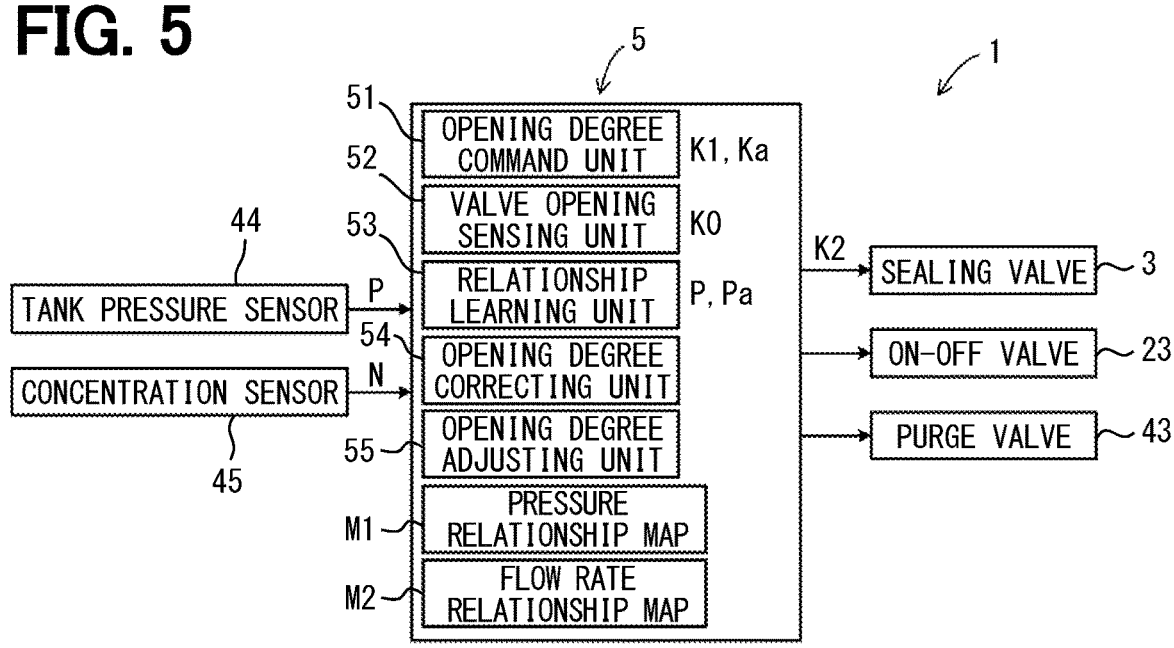
FIG. 5 is a descriptive diagram schematically indicating a control device of the evaporated fuel processing device according to the first embodiment.

As shown in FIGS. 1 and 5, the control device 5 of the evaporated fuel processing device 1 is implemented as one of control devices of the vehicle 6. The sealing valve 3, the purge valve 43 and the on-off valve 23 are connected as output devices to the control device 5 of the vehicle 6, so that an opening and closing operation of each of the sealing valve 3, the purge valve 43 and the on-off valve 23 can be executed based on a command outputted from the control device 5. When the control device 5 energizes the stepping motor 35 of the sealing valve 3 with a predetermined number of drive pulses, the valve 33 is lifted away from the opening 313 of the sealing flow passage 311 to open the opening 313. The pressure sensor 44 and the concentration sensor 45 are connected as input devices to the control device 5 of the vehicle 6 and can respectively output information of the pressure P and information of the concentration N to the control device 5.

The control device 5 of the evaporated fuel processing device 1 may be provided separately from the control devices of the vehicle 6 and may be connected to one or more of the control devices of the vehicle 6 such that data is transmittable between the control device 5 of the evaporated fuel processing device 1 and the one or more of the control devices of the vehicle 6.

In a normal state of the internal combustion engine 61 of the vehicle 6, in which the evaporated fuel F1 is not supplied to the internal combustion engine 61, a supply amount (the mass) of the combustion air A, which is supplied to the air intake pipe 611, is adjusted by adjusting an opening degree of the throttle valve 612, and a supply amount (the mass) of the fuel F to the internal combustion engine 61 is adjusted by adjusting the fuel injection amount of the respective fuel injection devices 63. An air-fuel ratio (A/F ratio), which is a ratio of the supply amount of the combustion air relative to the supply amount of the fuel, is adjusted to a target air-fuel ratio by the control device 5.

Figure 6:
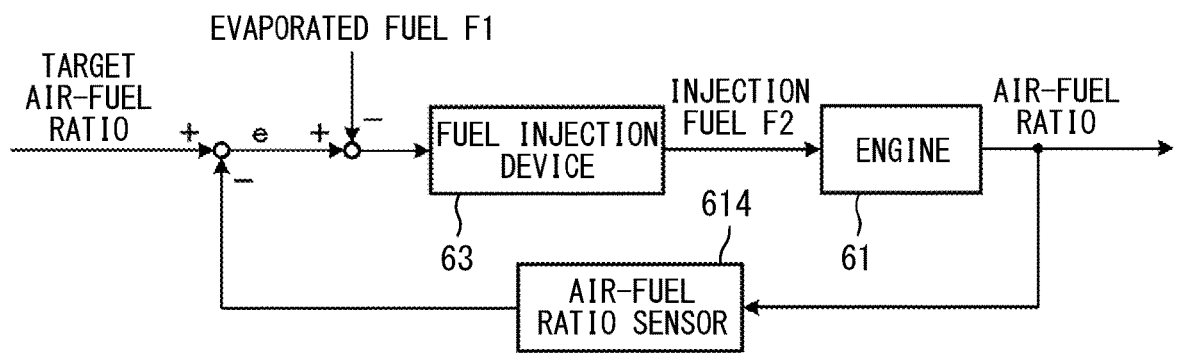
FIG. 6 is a block diagram schematically indicating a structure for controlling the air-fuel ratio of the internal combustion engine according to the first embodiment.

As shown in FIGS. 1 and 6, an air-fuel ratio sensor 614, which senses the air-fuel ratio of the internal combustion engine 61 by measuring the oxygen concentration and the fuel concentration in the exhaust gas, is installed in the exhaust pipe 613 of the internal combustion engine 61. The control device 5 is configured to execute a feedback control operation that adjusts the air-fuel ratio of the internal combustion engine 61 to the target air-fuel ratio through adjustment of the supply amount of the injection fuel F2 injected from the fuel injection devices 63 at the internal combustion engine 61 after receiving the feedback of the sensed air-fuel ratio from the air-fuel ratio sensor 614.

When the evaporated fuel F1 is not purged from the fuel tank 62 or the canister 2 to the air intake pipe 611, the supply of the injection fuel F2 from the fuel injection devices 63 is the only supply of the fuel to the cylinders of the internal combustion engine 61. Thereby, in such a case, the normal feedback control operation is executed at the internal combustion engine 61. In contrast, as shown in FIG. 2, when the purge operation 503 or the canister purge operation 502 is executed, the supply of the fuel to the internal combustion engine 61 includes the supply of the injection fuel F2 from the fuel injection devices 63 and the supply of the evaporated fuel (purge fuel) F1 from the evaporated fuel processing device 1. Thus, the feedback control operation of the operation time is executed at the internal combustion engine 61 while taking the supply amount of the evaporated fuel F1 into account.

At each of the cylinders of the internal combustion engine 61, an intake stroke, a compression stroke, a combustion stroke and an exhaust stroke are repeated, and the supply amount of the evaporated fuel F1 is the amount of substance supplied to all of the cylinders per unit time in the intake stroke of the respective cylinders. Likewise, the supply amount of the injection fuel F2 is the amount of substance supplied to all of the cylinders per unit time in the intake stroke.

As shown in FIG. 2, the opening degree of the sealing valve 3 regulates a rate of the flow of the vapor-phase gas G from the fuel tank 62 to the air intake pipe 611. The supply amount of the evaporated fuel F1, which is purged to the air intake pipe 611 of the internal combustion engine 61, is determined based on the relationship among: the opening degree of the sealing valve 3; the pressure P of the vapor-phase gas G sensed with the pressure sensor 44; and the concentration N of the hydrocarbons sensed with the concentration sensor 45. Furthermore, the flow rate of the vapor-phase gas G, which passes through the sealing valve 3, i.e., the flow rate of the vapor-phase gas G, which is purged from the fuel tank 62 to the air intake pipe 611, is determined based on the relationship between the opening degree of the sealing valve 3 and the pressure P of the vapor-phase gas G in the fuel tank 62.

Figure 7:
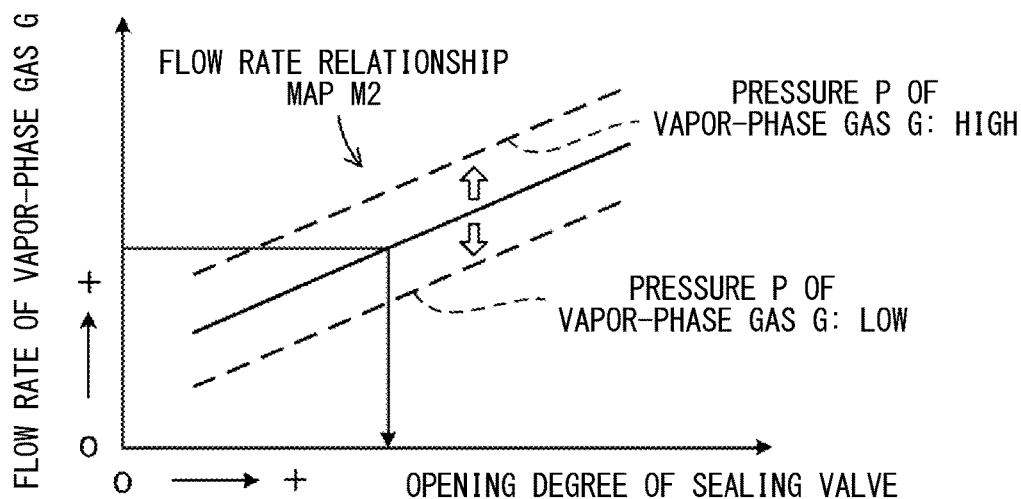
FIG. 7 is a graph indicating a relationship between an opening degree of a sealing valve and a flow rate of vapor-phase gas according to the first embodiment.

As shown in FIG. 7, the control device 5 has a flow rate relationship map M2, from which the flow rate of the vapor-phase gas G is obtained based on the pressure P of the vapor-phase gas G and the opening degree of the sealing valve 3 at the time of executing the purge operation 503. The control device 5 can obtain the flow rate of the vapor-phase gas G, which flows in the sealing valve 3, based on the sensed pressure P of the vapor-phase gas G in the fuel tank 62 and the opening degree of the sealing valve 3 according to the command of the drive pulse to the stepping motor 35 with reference to the flow rate relationship map M2.

Furthermore, the control device 5 is constructed to obtain the supply amount of the evaporated fuel F1, which is supplied from the evaporated fuel processing device 1 to the air intake pipe 611 of the internal combustion engine 61 at the purge operation 503, by multiplying the obtained flow rate of the vapor-phase gas G, which passes through the sealing valve 3, by the concentration N of the evaporated fuel (the hydrocarbon gas) F1 in the vapor-phase gas G sensed with the concentration sensor 45. The obtained supply amount of the evaporated fuel F1 is used to control the air-fuel ratio of the internal combustion engine 61 at the control device 5.

Furthermore, as shown in FIG. 2, at the time of executing the purge operation 503, a total supply amount of the fuel supplied to the internal combustion engine 61 is a sum of the supply amount of injection fuel F2, which is supplied from the fuel injection devices 63 to the internal combustion engine 61, and the supply amount of the evaporated fuel F1, which is purged from the evaporated fuel processing device 1 to the air intake pipe 611 of the internal combustion engine 61. The air-fuel ratio of the internal combustion engine 61 is a ratio between the total supply amount (total mass) of the injection fuel F2 and the evaporated fuel F1 and the supply amount (mass) of the combustion air supplied to the internal combustion engine 61.

At the time of executing the purge operation 503, the control device 5 is configured to set the set value of the supply amount of the fuel to the internal combustion engine 61, which is required to adjust the air-fuel ratio of the internal combustion engine 61 to the target air-fuel ratio, as the total supply amount, which is the sum of the supply amount of the injection fuel F2 injected by the fuel injection devices 63 of the internal combustion engine 61 and the supply amount of the evaporated fuel F1. In the control device 5 of the present embodiment, at the time of executing the purge operation 503, the supply amount of the evaporated fuel F1 is set as the set value, so that the air-fuel ratio is less likely to fluctuate at the time of executing the feedback control operation of the air-fuel ratio of the internal combustion engine 61.

Furthermore, as shown in FIG. 6, the control device 5 executes the feedback control operation such that the air-fuel ratio of the internal combustion engine 61 coincides with the target air-fuel ratio by determining the supply amount of the injection fuel F2 injected from the fuel injection devices 63 in view of the supply amount of the evaporated fuel F1, which is purged from the evaporated fuel processing device 1. In other words, the control device 5 reduces the supply amount of the injection fuel F2, which is injected from the fuel injection devices 63, by the supply amount of the evaporated fuel F1 purged from the evaporated fuel processing device 1, so that rapid approach of the air-fuel ratio to the target air-fuel ratio is promoted.

Furthermore, the control device 5 may execute the feedback control operation such that in order to compensate for the shortage of the fuel after determining the supply amount of the injection fuel F2 injected from the fuel injection devices 63, the opening degree of the sealing valve 3 is adjusted to adjust the supply amount of the evaporated fuel F1 supplied from the evaporated fuel processing device 1 to the air intake pipe 611, so that the air-fuel ratio of the internal combustion engine 61 is adjusted to the target air-fuel ratio.

Figure 8:
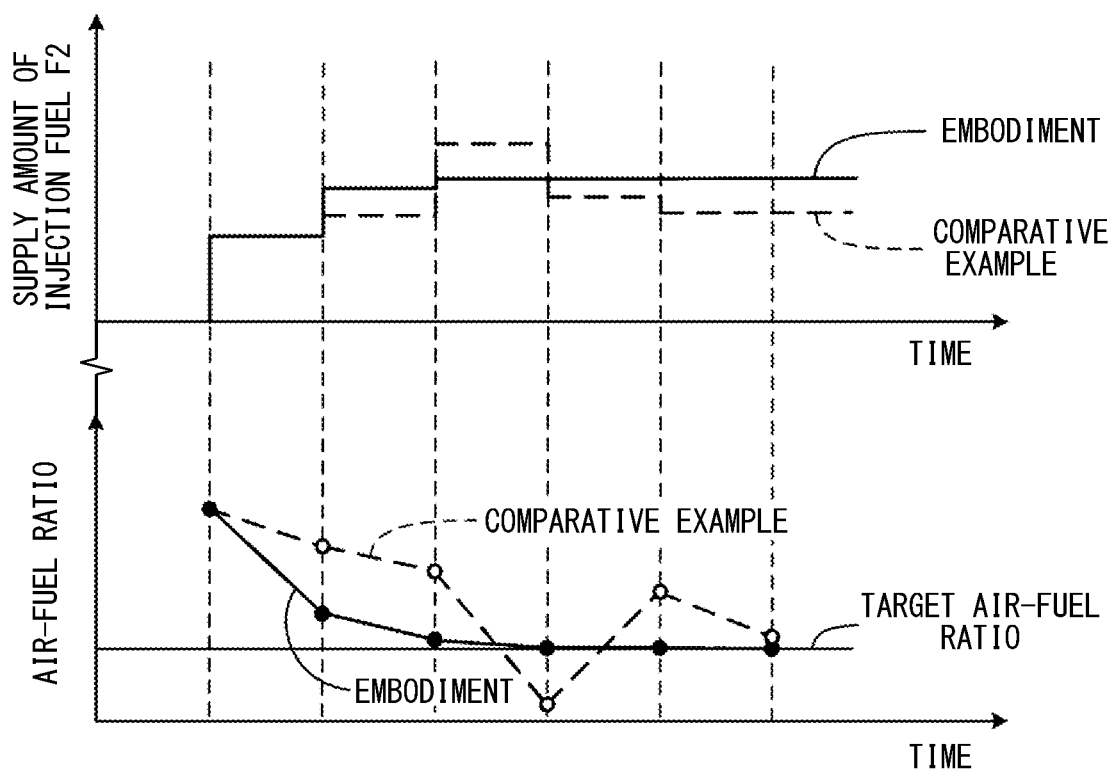
FIG. 8 is a graph indicating a temporal change between a supply amount of injection fuel and the air-fuel ratio according to the first embodiment.

A solid line shown in FIG. 8 schematically indicates a change in the air-fuel ratio with time when the feedback control operation of the air-fuel ratio of the internal combustion engine 61 is executed at the evaporated fuel processing device 1 of the present embodiment that uses the pressure P of the vapor-phase gas G and the concentration N of the evaporated fuel F1 in the vapor-phase gas G. In this case, since the supply amount of the evaporated fuel F1 can be accurately sensed, the supply amount of the injection fuel F2, which is injected from the fuel injection devices 63, is stabilized, and the time, which is required to adjust the air-fuel ratio to the target air-fuel ratio, can be reduced.

In contrast, a dotted line in FIG. 8 schematically indicates a change in the air-fuel ratio with time when the feedback control operation of the air-fuel ratio of the internal combustion engine 61 is not executed at a previously proposed evaporated fuel processing device (comparative example) that uses only the pressure P of the vapor-phase gas G and does not use the concentration N of the evaporated fuel F1. In this case, since the supply amount of the evaporated fuel F1 cannot be accurately sensed, the supply amount of the injection fuel F2, which is injected from the fuel injection devices 63, is changed in response to the change in the concentration N of the evaporated fuel F1, and the time, which is required to adjust the air-fuel ratio to the target air-fuel ratio, is increased.

(Respective Operations 501, 502, 503, 504 Executed by Control Device 5)

The sealing operation of the control device 5 is an operation, in which the valve 33 of the sealing valve 3 closes the opening 313 of the sealing flow passage 311 and thereby maintains the sealed state of the fuel tank 62. The sealing operation refers to an operation, in which a rotational position of the output shaft 351 of the stepping motor 35 is maintained, and the valve 33 is kept in the closing position (initial position) 301. At the normal time of the evaporated fuel processing device 1, the sealing operation of the control device 5 is performed.

The vapor operation 501 of the control device 5 is an operation, in which the vapor-phase gas G in the fuel tank 62 is purged to the canister 2 before the time of refueling, i.e., the time of supplying the fuel to the fuel tank 62. When the vapor operation 501 is executed, the pressure P of the vapor-phase gas G in the fuel tank 62 is reduced, so that release of the evaporated fuel F1 in the vapor-phase gas G received in the fuel tank 62 to the atmosphere is limited at the time of opening the fuel supply port 621 of the fuel tank 62.

The canister purge operation 502 of the control device 5 is an operation that is executed when the fuel components, which are adsorbed to the adsorbent 22 of the canister 2, are used in the combustion of a mixture gas that is a mixture of the fuel and the combustion air at the internal combustion engine 61.

The purge operation 503 of the control device 5 is an operation that is executed when the vapor-phase gas G received in the fuel tank 62 is purged to the air intake pipe 611 of the internal combustion engine 61 at the combustion operation of the internal combustion engine 61 after the time of refueling, i.e., the time of supplying the fuel to the fuel tank 62. In the purge operation 503, the evaporated fuel F1 in the vapor-phase gas G is not adsorbed to the adsorbent 22 of the canister 2 and is passed through a portion of the canister 2. When the purge operation 503 is executed, the pressure P of the vapor-phase gas G in the fuel tank 62 can be reduced during the combustion operation of the internal combustion engine 61.

The control device 5 can also execute a learning operation 504. The learning operation 504 of the control device 5 is executed in the middle of executing the sealing operation such that a valve opening degree command amount K1, which is outputted from an opening degree command unit 51 to the stepping motor 35, is progressively increased from zero. Furthermore, the learning operation 504 is executed in a process of changing the pressure P of the vapor-phase gas G in the fuel tank 62 in the middle of executing the sealing operation. By executing the learning operation 504, a pressure relationship map M1, which indicates a relationship between a valve opening start amount K0 and the pressure P of the vapor-phase gas G is obtained for a plurality of different cases, in which the pressure P of the vapor-phase gas G differs from each other.

(Specific Structure of Control Device 5)

The control device 5 has: a function of correcting a dead zone generated at the sealing valve 3; and a function of adjusting the opening degree of the sealing valve 3 such that the purge supply amount of the evaporated fuel F1 is kept constant. The function of correcting the dead zone focuses on the fact that the sealing valve 3 opens only when the command amount to the stepping motor 35, which drives the sealing valve 3, reaches a predetermined amount, and the function of correcting the dead zone increases the command amount by this predetermined amount. The function of adjusting the opening degree is a function of adjusting the opening degree of the sealing valve 3 such that the purge supply amount of the evaporated fuel F1 is kept constant based on the pressure P of the vapor-phase gas G, which is sensed with the pressure sensor 44, and the concentration N of the evaporated fuel F1, which is contained in the vapor-phase gas G and is sensed with the concentration sensor 45.

As shown in FIG. 5, the control device 5 includes the opening degree command unit 51, a valve opening sensing unit 52, a relationship learning unit 53, an opening degree correcting unit 54 and an opening degree adjusting unit 55. The opening degree command unit 51 is configured to transmit the valve opening degree command amount K1, which is used to determine the opening degree of the sealing valve 3, to the stepping motor 35. The valve opening sensing unit 52 is configured to sense reaching of the valve opening degree command amount K1 to the valve opening start amount K0, which indicates a start of a decrease in the pressure P of the vapor-phase gas G, at the time of progressively increasing the valve opening degree command amount K1 from zero. In the present embodiment, when the pressure P of the vapor-phase gas G begins to decrease, it is determined that the state of the sealing valve 3 is changed from a closing state, in which the sealing valve 3 is closed, to an opening state, in which the sealing valve 3 is opened.

Figure 9:
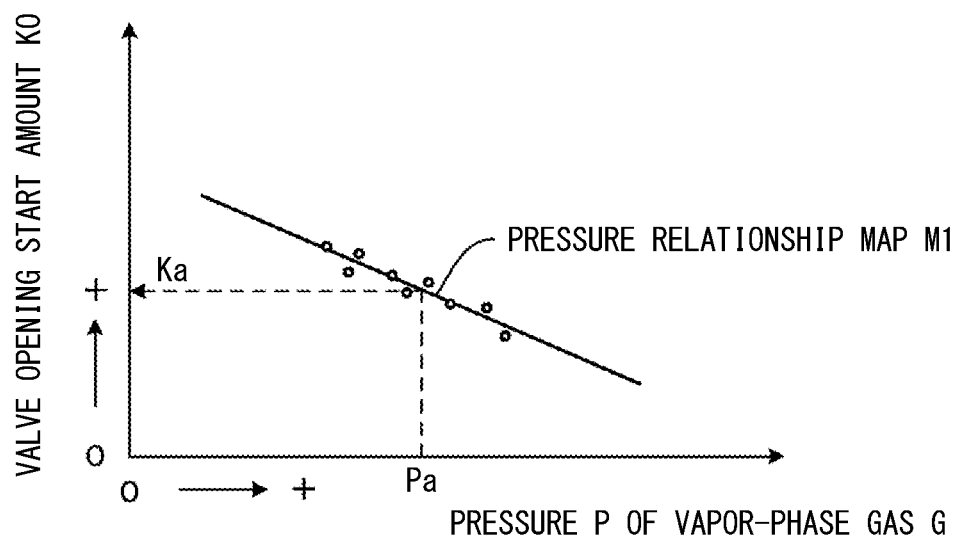
FIG. 9 is a graph indicating a relationship map showing a relationship between a pressure of the vapor-phase gas and a valve opening start amount according to the first embodiment.

As shown in FIG. 9, the relationship learning unit 53 is configured to form the pressure relationship map M1, which indicates the relationship between the valve opening start amount K0 and the pressure P of the vapor-phase gas G, by learning the relationship between the valve opening start amount K0 and the pressure P of the vapor-phase gas G at the time of sensing different valve opening start amounts K0 with the valve opening sensing unit 52 and sensing different pressures P of the vapor-phase gas G with the pressure sensor 44. The valve opening start amount K0 is reduced when the pressure P of the vapor-phase gas G, which is sensed with the pressure sensor 44, is increased. In other words, when the pressure P of the vapor-phase gas G, which is sensed with the pressure sensor 44, is increased, the dead zone of the sealing valve 3 is increased, and thereby the sealing valve 3 becomes difficult to open.

The opening degree correcting unit 54 has the function of correcting the dead zone and is configured to correct the valve opening degree command amount K1, which is set by the opening degree command unit 51, as follows. Specifically, an operation-time pressure Pa, which is the pressure P of the vapor-phase gas G sensed with the pressure sensor 44 at the time of opening the sealing valve 3 in the vapor operation 501 or the purge operation 503, is compared with the pressure relationship map M1, and thereby an operation-time valve opening start amount Ka, which is the valve opening start amount K0 at this time, is obtained from the pressure relationship map M1. Then, the valve opening degree command amount K1, which is set by the opening degree command unit 51, is corrected by the operation-time valve opening start amount Ka.

With reference to FIG. 7, the opening degree adjusting unit 55 has the function of adjusting the opening degree and is configured to determine the opening degree of the sealing valve 3, which is required to implement a target flow rate of the vapor-phase gas, by comparing the pressure P of the vapor-phase gas G, which is sensed with the pressure sensor 44, with the flow rate relationship map M2, at the time of opening the sealing valve 3 for executing the purge operation 503.

(Opening Degree Command Unit 51)

With reference to FIGS. 3 and 4, the opening degree command unit 51 of the control device 5 transmits a predetermined number of drive pulses as the valve opening degree command amount K1 to the stepping motor 35 of the sealing valve 3 to drive the stepping motor 35 in the vapor operation 501, the purge operation 503 and the learning operation 504. The valve opening degree command amount K1, which is set by the opening degree command unit 51, is defined by the number of drive pulses for driving the stepping motor 35. The output shaft 351 of the stepping motor 35 is rotated by a predetermined angle by the drive pulses transmitted to the stepping motor 35, so that the valve guide 32, the valve 33 and the valve-side spring 34 are stroked, i.e., moved by a predetermined amount in the axial direction L.

The opening degree of the sealing valve 3 is determined based on the number of the pulses transmitted to the stepping motor 35. However, the sealing valve 3 has the dead zone, and the dead zone is indicated by a pulse number that is the number of pulses, which are supplied to the stepping motor 35 but do not cause movement of the valve 33 of the sealing valve 3 from the closing position 301 even when the stepping motor 35 is energized in a stepped manner in the state where the valve 33 is placed in the closing position 301. In other words, the dead zone is indicated by the pulse number that is the number of pulses, which are supplied to the stepping motor 35 but do not cause movement of the sealing material 333 of the valve 33 away from the sealing flow passage 311, and thereby the pressure P of the vapor-phase gas G does not begin to decrease. Furthermore, the pulse number, which corresponds to the dead zone, is indicated as the valve opening start amount K0 of the sealing valve 3.

Figure 10:
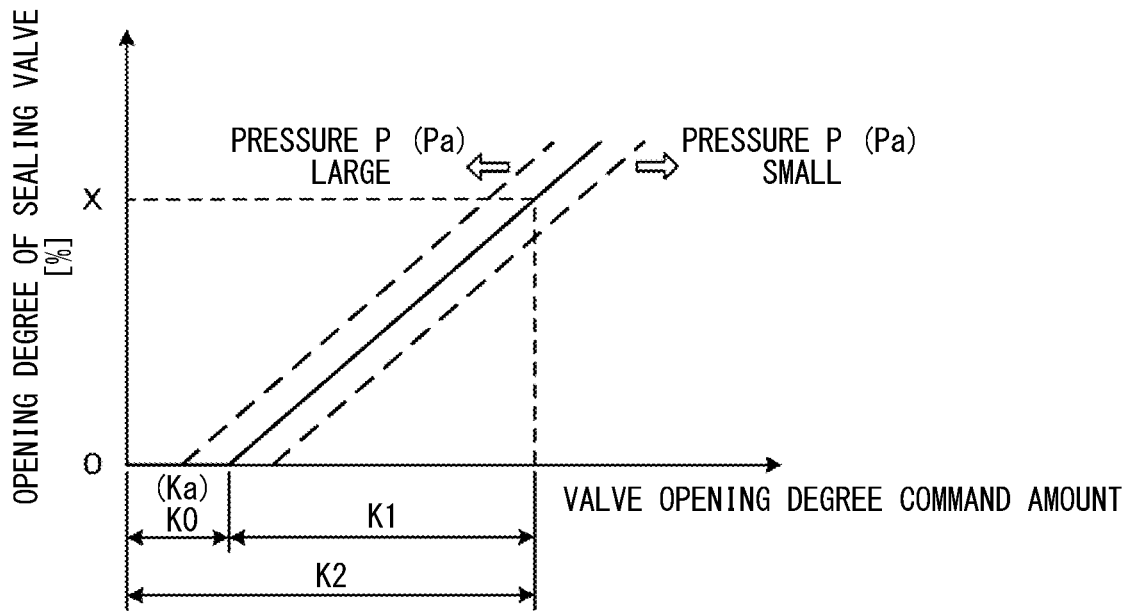
FIG. 10 is a graph indicating a relationship between a valve opening degree command amount computed by a control device and an opening degree of the sealing valve according to the first embodiment.

As indicated in FIG. 10, the valve opening start amount K0 compensates the dead zone of the sealing valve 3. By adding the valve opening start amount K0 to the valve opening degree command amount K1, which is set by the opening degree command unit 51, the opening degree of the sealing valve 3 can be proportionally changed from zero in view of the valve opening degree command amount K1. Furthermore, the valve opening start amount K0 can be regarded as an opening degree correction amount for correcting the valve opening degree command amount K1, which is set by the opening degree command unit 51. The valve opening start amount K0, which serves as the opening degree correction amount, is changed according to the pressure P of the vapor-phase gas G.

In the vapor operation 501, when the flow rate of the vapor-phase gas G, which is purged from the fuel tank 62 to the canister 2, is too small, the time required to purge the vapor-phase gas G, is increased. In contrast, when the flow rate of the vapor-phase gas G, which is purged from the fuel tank 62 to the canister 2, is too large, the evaporated fuel F1 contained in the vapor-phase gas G may not be adsorbed to the adsorbent 22 and may pass through the adsorbent 22 to the pressure release opening 213 of the canister 2. In order to address the above disadvantage, the opening degree of the sealing valve 3 is appropriately set to appropriately set the flow rate of the vapor-phase gas G, which passes through the sealing valve 3. The vapor-phase gas G, which flows from the fuel tank 62 to the canister 2 or the air intake pipe 611 of the internal combustion engine 61, may possibly include, for example, the air besides the evaporated fuel F1.

As shown in FIG. 7, the flow rate of the vapor-phase gas G, which passes through the sealing valve 3, is proportional to a product of the opening degree of the sealing valve 3 and the pressure P of the vapor-phase gas G. Therefore, in the evaporated fuel processing device 1, in order to adjust the flow rate of the vapor-phase gas G, which passes through the sealing valve 3, to the target flow rate by the opening degree correcting unit 54, the opening degree of the sealing valve 3 is corrected such that the opening degree of the sealing valve 3 is reduced when the pressure P of the vapor-phase gas G is increased.

As shown in FIG. 10, the opening degree command unit 51 determines the valve opening degree command amount K1 such that the vapor-phase gas G flows at the target flow rate through the sealing valve 3 in the vapor operation 501 and the purge operation 503. At this time, the opening degree correcting unit 54 corrects the valve opening degree command amount K1 by the valve opening start amount K0, so that the flow rate of the vapor-phase gas G, which flows through the sealing valve 3, is corrected.

(Valve Opening Sensing Unit 52)

As shown in FIG. 9, in the learning operation 504, the valve opening sensing unit 52 of the control device 5 monitors the valve opening degree command amount K1, which is transmitted from the opening degree command unit 51 to the stepping motor 35, and the pressure P of the vapor-phase gas G, which is received from the pressure sensor 44, in the state where the valve 33 is placed in the closing position (the initial position) 301, and the valve opening sensing unit 52 senses the valve opening degree command amount K1 at the time of starting the decrease in the pressure P of the vapor-phase gas G as the valve opening start amount K0. The valve opening start amount K0 is represented by a cumulative value of the number of drive pulses transmitted to the stepping motor 35. The time of starting the decrease in the pressure P of the vapor-phase gas G can be defined as the time when the pressure P of the vapor-phase gas G is decreased by a predetermined amount.

(Relationship Learning Unit 53)

As shown in FIG. 9, the relationship learning unit 53 of the control device 5 is constructed to correct the valve opening degree command amount K1, which is set by the opening degree command unit 51, by the pressure P of the vapor-phase gas G after the time of starting the operation (use) of the vehicle 6 and the evaporated fuel processing device 1. The valve opening degree command amount K1, which is set by the opening degree command unit 51, is progressively increased from zero in the state where the valve 33 is placed in the closing position 301, and the relationship learning unit 53 obtains the valve opening start amount K0, which is sensed with the valve opening sensing unit 52. This process is repeated for each of a plurality of cases, in each of which the pressure P of the vapor-phase gas G is different from the other cases. Then, as shown in FIG. 9, based on the learning of the relationship between the valve opening start amount K0 and the pressure P of the vapor-phase gas G discussed above, the pressure relationship map M1, which indicates the relationship between the valve opening start amount K0 and the pressure P of the vapor-phase gas G, is formed.

As shown in FIGS. 3, 4 and 9, the pressure P of the vapor-phase gas G, which is exerted at the flow inlet 312 of the sealing flow passage 311, is larger than the pressure in the canister 2, which is exerted at the flow outlet 314 of the sealing flow passage 311, and the pressure, which urges the valve 33 toward the proximal end side L2 in the axial direction L, is exerted to the valve 33. When the pressure P of the vapor-phase gas G is increased, the pressure, which urges the valve 33 toward the proximal end side L2 in the axial direction L, is increased. Therefore, the valve opening start amount K0 of the on-off valve 23, which is sensed by the valve opening sensing unit 52, is reduced when the pressure P of the vapor-phase gas G is increased.

(Opening Degree Correcting Unit 54)

As shown in FIG. 10, the opening degree correcting unit 54 of the control device 5 corrects the valve opening degree command amount K1, which is set by the opening degree command unit 51, in view of the valve opening start amount K0. Although the opening degree of the sealing valve 3 is not directly sensed, the opening degree correcting unit 54 corrects an error factor caused by the dead zone of the sealing valve 3, so that the opening degree of the sealing valve 3 is shifted toward the target opening degree, and thereby the flow rate of the vapor-phase gas G, which passes through the sealing valve 3, is controlled to the appropriate flow rate.

As shown in FIG. 9, the opening degree correcting unit 54 corrects the valve opening degree command amount K1, which is set by the opening degree command unit 51, by using the pressure relationship map M1, which indicates the relationship between the valve opening start amount K0 and the pressure P of the vapor-phase gas G, in each of the vapor operation 501 and the purge operation 503. The opening degree correcting unit 54 senses the operation-time pressure Pa with the pressure sensor 44 at the time of executing each of the vapor operation 501 and the purge operation 503 while the operation-time pressure Pa is the pressure P of the vapor-phase gas G at the time of opening the vapor pipe 41 through opening of the sealing valve 3.

Next, the opening degree correcting unit 54 obtains the operation-time valve opening start amount Ka, which is the valve opening start amount K0 corresponding to the sensed operation-time pressure Pa, through comparison of the sensed operation-time pressure Pa with the pressure relationship map M1. Next, the opening degree correcting unit 54 corrects the valve opening degree command amount K1 by adding the obtained operation-time valve opening start amount Ka to the valve opening degree command amount K1 at the time when the opening degree command unit 51 transmits the valve opening degree command amount K1 to the stepping motor 35 of the sealing valve 3. In other words, the opening degree correcting unit 54 corrects the pulse number, which serves as the valve opening degree command amount K1 transmitted from the opening degree command unit 51 to the stepping motor 35, by adding the pulse number, which corresponds to the operation-time valve opening start amount Ka, to the pulse number, which corresponds to the valve opening degree command amount K1.

In this way, as shown in FIG. 10, the opening degree correcting unit 54 obtains the corrected valve opening degree command amount K2 that is generated by adding the operation-time valve opening start amount Ka to the valve opening degree command amount K1, which is determined based on the target opening degree that serves as the target value of the opening degree of the sealing valve 3. Then, in each of the vapor operation 501 and the purge operation 503, when the vapor pipe 41 is opened by the sealing valve 3, the opening degree command unit 51 transmits the corrected valve opening degree command amount K2 to the stepping motor 35 of the sealing valve 3, and the opening degree of the sealing valve 3 is determined.

(Opening Degree Adjusting Unit 55)

As shown in FIG. 7, the opening degree adjusting unit 55 adjusts the opening degree of the sealing valve 3 such that the flow rate of the vapor-phase gas G, which flows through the sealing valve 3, is adjusted to the appropriate flow rate at the time of executing the purge operation 503. A restriction valve is installed in the vapor pipe 41. The restriction valve is configured to close the vapor pipe 41, which extends from the fuel tank 62 to the canister 2, when the flow rate of the vapor-phase gas G, which flows through the sealing valve 3, is increased beyond a predetermined restriction amount. When the opening degree of the sealing valve 3 is excessively reduced, the time, which is required for the pressure P of the vapor-phase gas G contained in the fuel tank 62 to decrease to a predetermined value or smaller at the time of purging the vapor-phase gas G to the air intake pipe 611, is increased. Therefore, the opening degree adjusting unit 55 increases the opening degree of the sealing valve 3 to an extent that enables the feedback control operation of the air-fuel ratio of the internal combustion engine 61.

Furthermore, the opening degree adjusting unit 55 can adjust the opening degree of the sealing valve 3 such that the flow rate of the vapor-phase gas G, which flows through the sealing valve 3, approaches a constant flow rate. At the time immediately after the start of the purge operation 503, the pressure P of the vapor-phase gas G contained in the fuel tank 62 is relatively large. Therefore, even when the opening degree of the sealing valve 3 is reduced, the flow rate of the vapor-phase gas G can be kept to a relatively large flow rate. In contrast, when the pressure P of the vapor-phase gas G contained in the fuel tank 62 is reduced after elapse of a certain time period after the start of the purge operation 503, the flow rate of the vapor-phase gas G is reduced unless the opening degree of the sealing valve 3 is increased. Therefore, the opening degree adjusting unit 55 is configured to increase the opening degree of the sealing valve 3 as the time elapses from the start of the purge operation 503. Thereby, the flow rate of the vapor-phase gas G, which flows through the sealing valve 3, can be kept to the appropriate flow rate.

Furthermore, when the pressure P of the vapor-phase gas G, which is sensed with the pressure sensor 44, is increased to the predetermined value or larger, the control device 5 can start the purge operation 503. In contrast, when the pressure P of the vapor-phase gas G, which is sensed with the pressure sensor 44, is decreased to the predetermined value or smaller, the control device 5 can terminate the purge operation 503.

(Control Operation of Evaporated Fuel Processing Device 1)

As shown in FIG. 1, in the vehicle 6, the control device 5 executes the sealing operation. When the opening degree of the sealing valve 3 is zero to close the sealing flow passage 311 of the housing 31 with the valve 33, the vapor pipe 41, which extends from the fuel tank 62 to the canister 2, is closed. Then, the pressure P of the vapor-phase gas G contained in the fuel tank 62 is increased as appropriate. Hereinafter, the learning operation 504, the vapor operation 501, the canister purge operation 502 and the purge operation 503 will be described with reference to flowcharts shown in FIGS. 11-16.

(Learning Operation 504)

Figure 11:
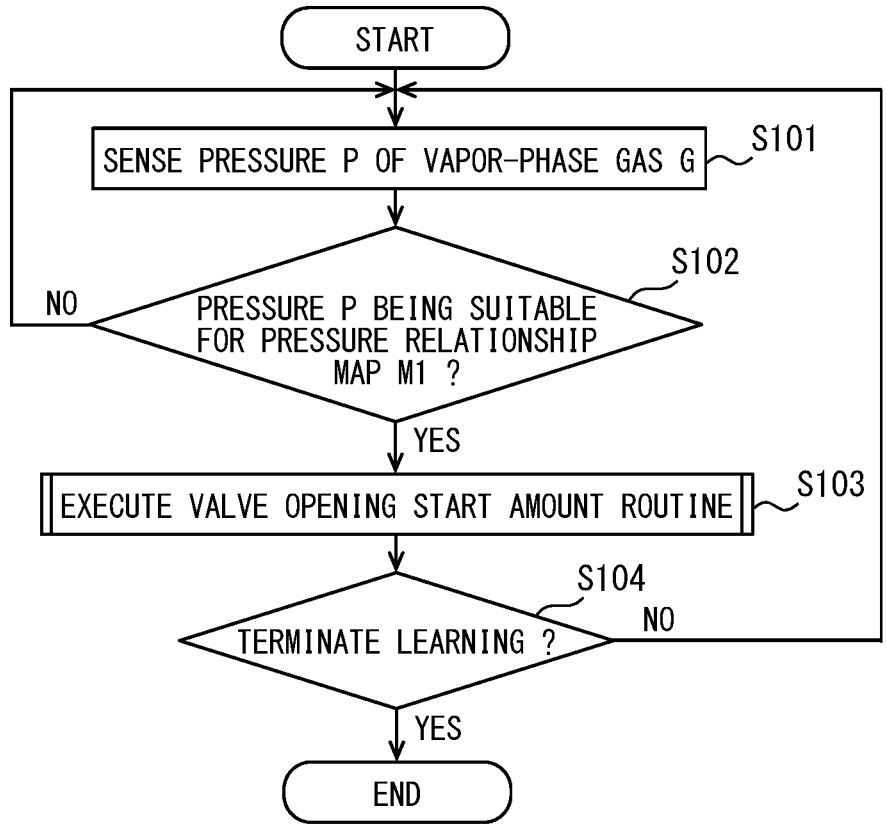
FIG. 11 is a flowchart indicating a learning operation according to the first embodiment.

As shown in the flowchart of FIG. 11, when the opening degree of the sealing valve 3 is zero, the control device 5 executes the learning operation 504. In the learning operation 504, the pressure P of the vapor-phase gas G is sensed with the pressure sensor 44 (step S101). Then, the relationship learning unit 53 of the control device 5 determines whether the sensed pressure P of the vapor-phase gas G is suitable for preparation of the pressure relationship map M1 (step S102). This determination is made to obtain the relationship between each of different pressures P of the vapor-phase gas G and the valve opening start amount K0 as the pressure relationship map M1.

Figure 12:
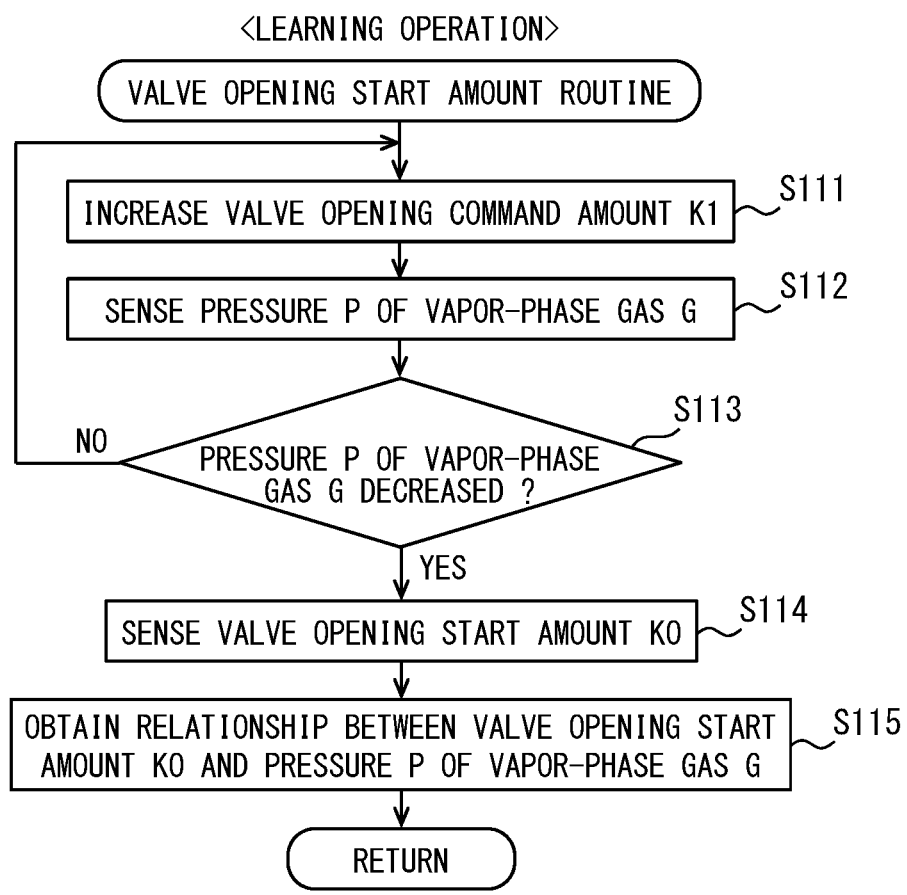
FIG. 12 is a flowchart indicating the learning operation according to the first embodiment.

In a case where the sensed pressure P of the vapor-phase gas G is suitable for the preparation of the pressure relationship map M1, a valve opening start amount routine is executed (step S103). As shown in the flowchart of FIG. 12, in the valve opening start amount routine, the opening degree command unit 51 of the control device 5 increases the valve opening degree command amount K1 of the opening degree command unit 51 by a predetermined amount (step S111). At this time, the valve opening sensing unit 52 of the control device 5 senses the pressure P of the vapor-phase gas G through the pressure sensor 44 (step S112), and the valve opening sensing unit 52 determines whether the pressure P of the vapor-phase gas G begins to decrease (step S113). When the valve opening sensing unit 52 determines that the pressure P of the vapor-phase gas G begins to decrease, the valve opening sensing unit 52 senses the valve opening degree command amount K1 of this time point as the valve opening start amount K0 (step S114). In this way, with respect to the time of sensing the start of the decrease in the pressure P of the vapor-phase gas G, the relationship between the valve opening start amount K0 and the pressure P of the vapor-phase gas G is obtained as a portion of the pressure relationship map M1 (step S115).

Thereafter, as shown in the flowchart of FIG. 11, the sensing of the pressure P of the vapor-phase gas G with the pressure sensor 44 is continuously executed (step S101). Furthermore, the relationship learning unit 53 determines whether the sensed pressure P of the vapor-phase gas G is suitable for the preparation of the pressure relationship map M1 (step S102). The valve opening start amount routine is repeated every time when corresponding each of the different pressures P of the vapor-phase gas G is sensed (steps S103, S111-S115).

As discussed above, until the learning operation 504 is terminated (step S104), the relationship between the valve opening start amount K0 and the pressure P of the vapor-phase gas G is obtained within the suitable range, in which the pressure P of the vapor-phase gas G varies (step S115), and the pressure relationship map M1, which indicates the relationship between the valve opening start amount K0 and the pressure P of the vapor-phase gas G, is formed.

(Vapor Operation 501)

An occupant of the vehicle 6 presses a refueling switch, which is located in a cabin of the vehicle, at the time of refueling, i.e., the time of supplying the fuel F to the fuel tank 62. Then, when the control device 5 executes the vapor operation 501 after recognition of the operation time in response to the operation of the refueling switch, the opening degree correcting unit 54 corrects the valve opening degree command amount K1, which is set by the opening degree command unit 51, by using the pressure relationship map M1.

Figure 13:
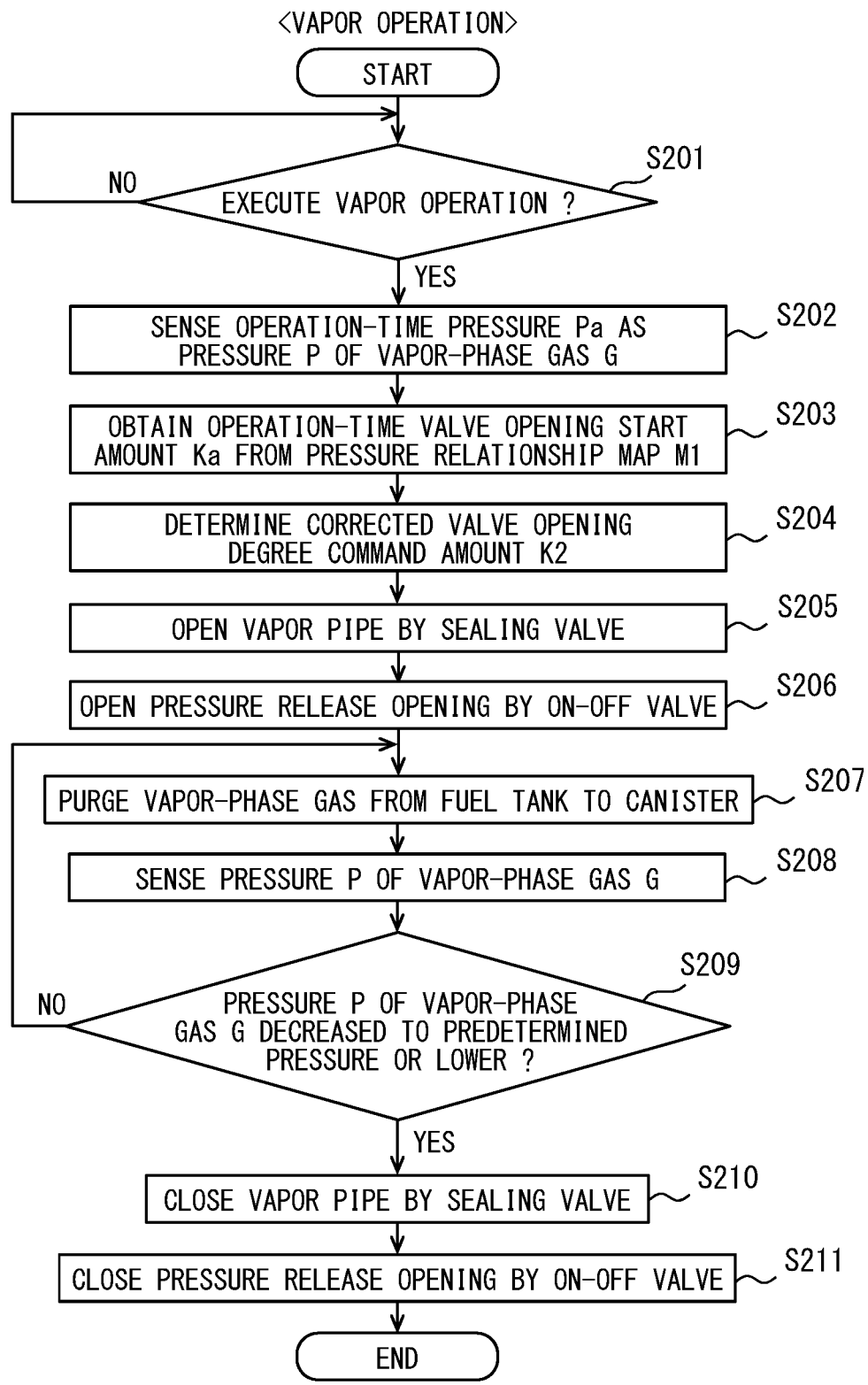
FIG. 13 is a flowchart indicating a vapor operation according to the first embodiment.

Specifically, as shown in the flowchart of FIG. 13, it is determined whether the vapor operation 501 needs to be executed based on whether the input of the refueling switch exists (step S201). When the refueling switch is pressed, the operation time is recognized. Therefore, the operation-time pressure Pa, which is the pressure P of the vapor-phase gas G at the operation time, is sensed with the pressure sensor 44 (step S202).

Next, as shown in FIG. 9, the operation-time pressure Pa is compared with the pressure relationship map M1, and thereby the operation-time valve opening start amount Ka, which is the valve opening start amount K0 corresponding to this operation-time pressure Pa, is obtained from the pressure relationship map M1 (step S203). Then, as shown in FIG. 10, the valve opening degree command amount K1, which is set by the opening degree command unit 51, is determined as the corrected valve opening degree command amount K2, which is obtained by adding the operation-time valve opening start amount Ka to the valve opening degree command amount K1 that corresponds to the target opening degree (step S204). The target opening degree is determined according to a target flow rate of the vapor-phase gas G, which is purged from the fuel tank 62 to the canister 2.

Next, the corrected valve opening degree command amount K2 is transmitted from the opening degree command unit 51 to the stepping motor 35 of the sealing valve 3, and the sealing valve 3 is opened to open the vapor pipe 41 (step S205). Furthermore, the on-off valve 23 of the canister 2 is opened based on a command outputted from the control device 5, so that the pressure release opening 213 is opened by the on-off valve 23 (step S206). As described above, the flow rate of the vapor-phase gas G, which flows through the sealing valve 3, is controlled to the target flow rate, and the vapor-phase gas G is purged from the fuel tank 62 to the canister 2 through the vapor pipe 41 (step S207). At this time, the vapor-phase gas G contained in the fuel tank 62 flows to the canister 2 due to a difference between the pressure P of the vapor-phase gas G contained in the fuel tank 62 and the pressure in the canister 2, and the fuel components of the evaporated fuel F1 contained in the vapor-phase gas G are adsorbed to the adsorbent 22 of the canister 2.

Thereafter, the pressure P of the vapor-phase gas G is sensed with the pressure sensor 44 (step S208), and it is determined whether the pressure P of the vapor-phase gas G is decreased to the predetermined pressure or lower (step S209). When the pressure P of the vapor-phase gas G is decreased to the predetermined pressure or lower, the sealing valve 3 is closed to close the vapor pipe 41 (step S210). Furthermore, the on-off valve 23 is closed to close the pressure release opening 213 of the canister 2 (step S211). In this way, the vapor operation 501 is terminated, and the control device 5 opens the fuel supply port 621. Thereby, the occupant of the vehicle 6 can supply the fuel to the fuel tank 62 through the fuel supply port 621.

Furthermore, when the occupant of the vehicle 6 or another person supplies the fuel F to the fuel tank 62, the sealing valve 3 can be opened to open the vapor pipe 41, and the on-off valve 23 can be opened to open the pressure release opening 213 of the canister 2.

(Canister Purge Operation 502)

The canister purge operation 502 is executed to purge the fuel components, which are adsorbed to the adsorbent 22 of the canister 2, to the air intake pipe 611 of the internal combustion engine 61 at the time of executing the combustion operation of the internal combustion engine 61. The timing of executing the canister purge operation 502 can be appropriately determined by the control device 5 of the internal combustion engine 61.

Figure 14:
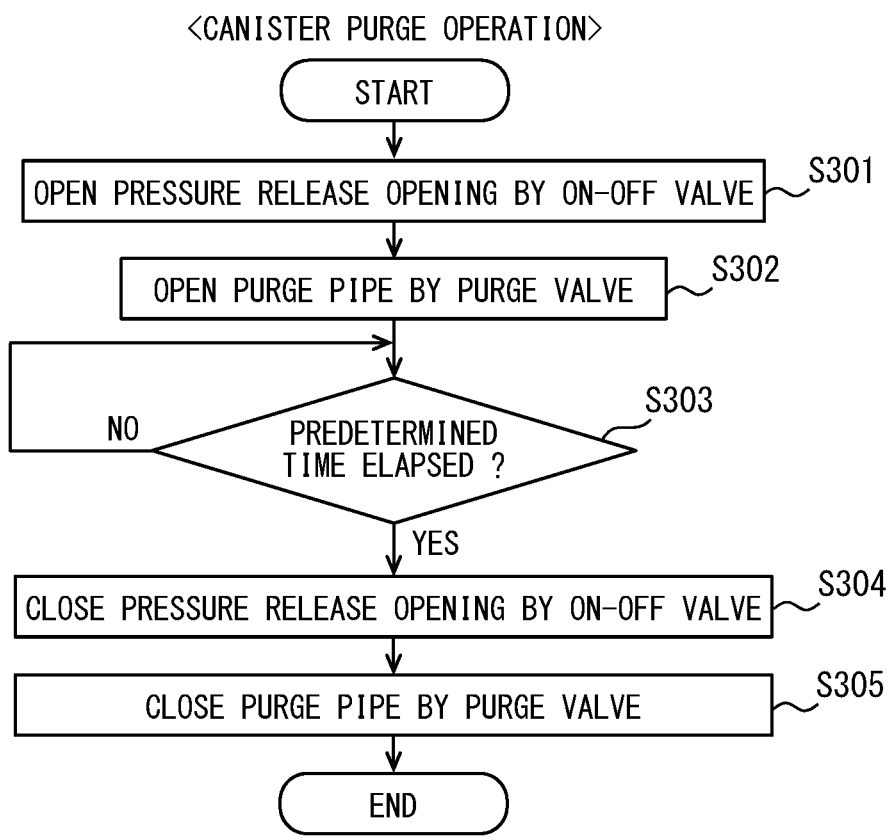
FIG. 14 is a flowchart indicating a canister purge operation according to the first embodiment.

Specifically, as shown in the flowchart of FIG. 14, when the fuel components, which are adsorbed to the adsorbent 22, are purged from the canister 2 to the air intake pipe 611 of the internal combustion engine 61, the on-off valve 23 is opened to open the pressure release opening 213 of the canister 2 (step S301), and the purge valve 43 is opened to open the purge pipe 42 (step S302). At this time, the canister 2 is connected to the air intake pipe 611 of the internal combustion engine 61 through the purge pipe 42. Then, the fuel components of the adsorbent 22 flow to the air intake pipe 611 due to the difference between the pressure (the atmospheric pressure) in the canister 2 and the pressure (the negative pressure) in the air intake pipe 611 of the internal combustion engine 61. The fuel components, which are desorbed from the adsorbent 22, are used in the combustion operation of the internal combustion engine 61 along with the fuel F injected at the internal combustion engine 61.

Next, it is determined whether a predetermined time period has been elapsed since the time of opening the on-off valve 23 and the purge valve 43 (step S303). Then, when it is determined that the predetermined time period has been elapsed since the time of opening the on-off valve 23 and the purge valve 43, the on-off valve 23 is closed to close the pressure release opening 213 of the canister 2 (step S304), and the purge valve 43 is closed to close the purge pipe 42 (step S305). In this way, the canister purge operation 502 is terminated, and the fuel components, which are adsorbed to the adsorbent 22 of the canister 2, are used in the combustion operation of the internal combustion engine 61.

(Purge Operation 503)

Figure 15:
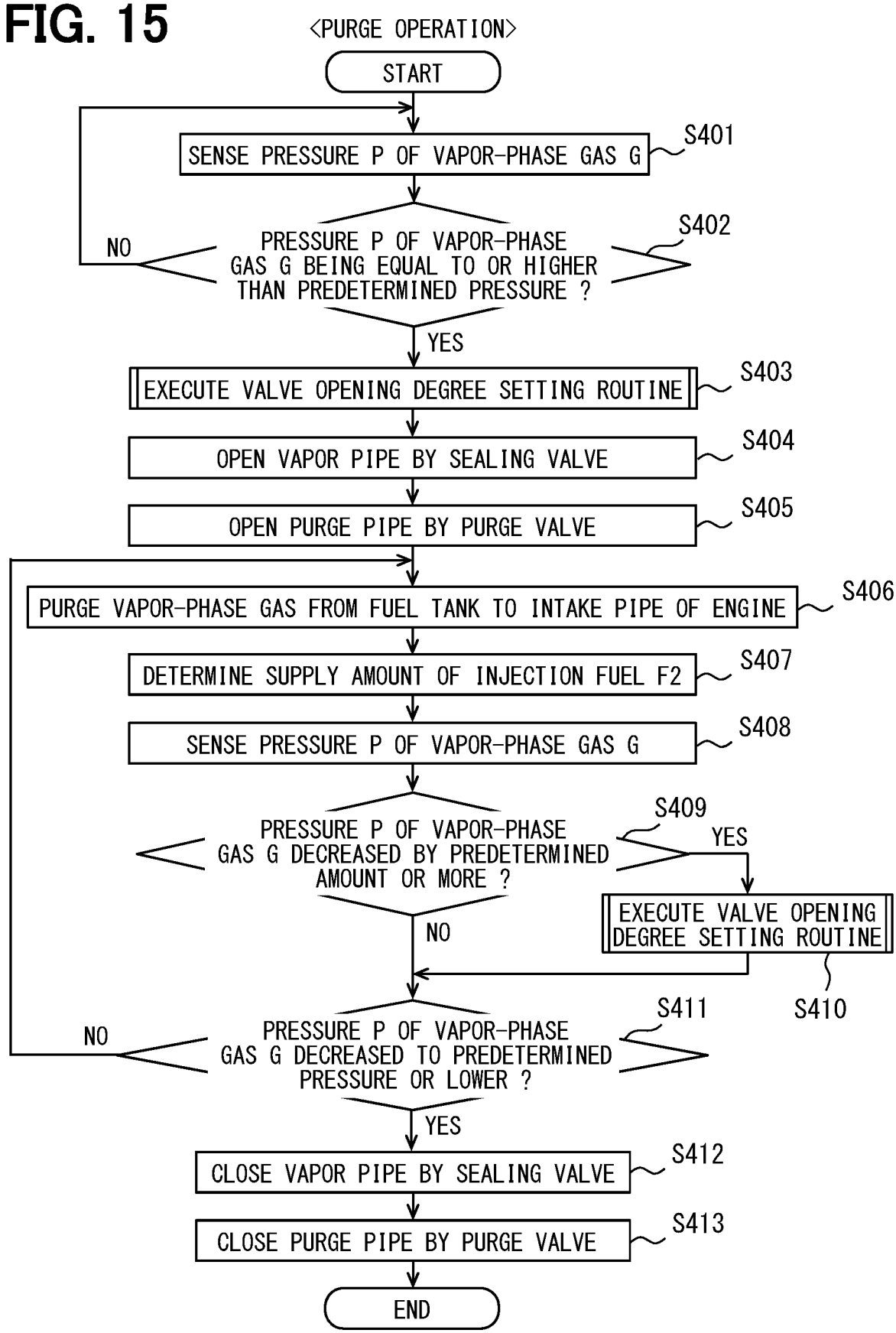
FIG. 15 is a flowchart indicating a purge operation according to the first embodiment.

With reference to the flowchart of FIG. 15, when the combustion operation of the internal combustion engine 61 is executed, the sealing valve 3 is normally closed to seal the fuel tank 62. Furthermore, the pressure P of the vapor-phase gas G is kept sensed with the pressure sensor 44 of the fuel tank 62 (step S401). Then, it is determined whether the pressure P of the vapor-phase gas G is equal to or higher than the predetermined pressure (step S402). When it is determined that the pressure P of the vapor-phase gas G is equal to or higher than the predetermined pressure, the operation time is recognized, and the control device 5 executes the purge operation 503.

Figure 16:
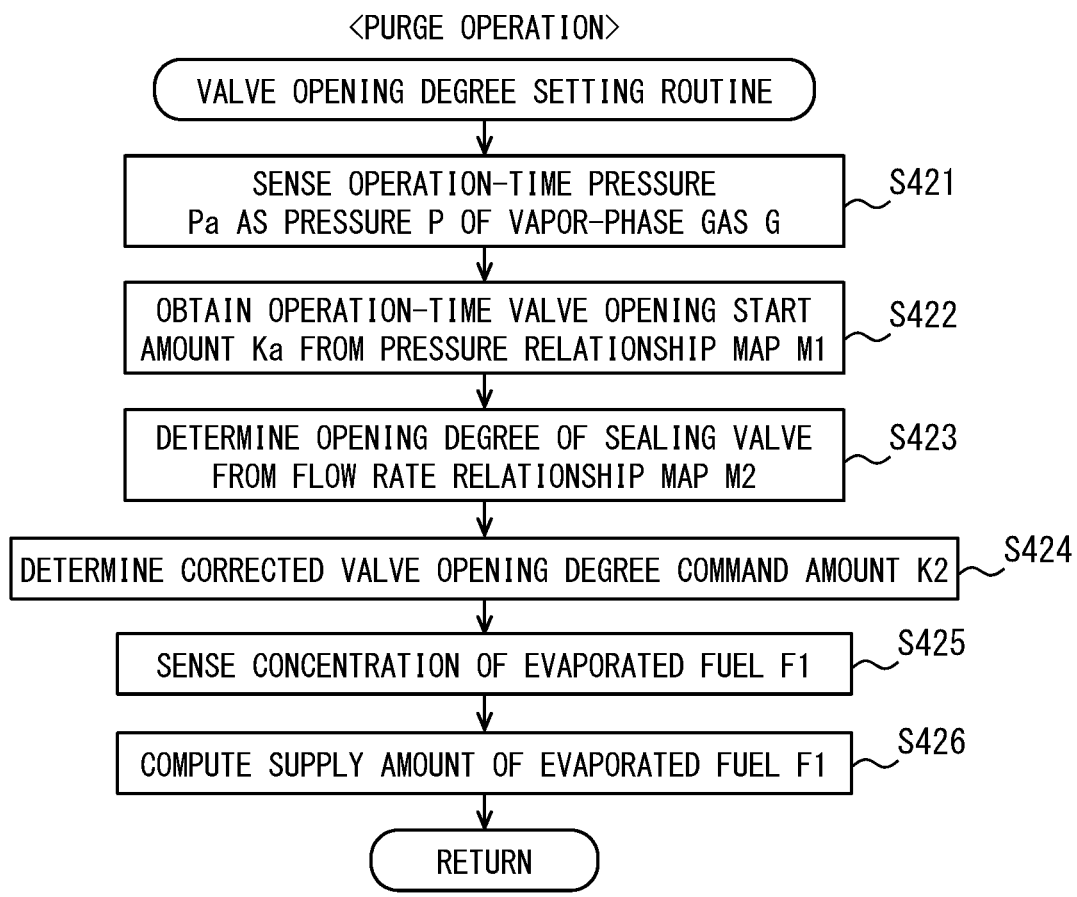
FIG. 16 is a flowchart indicating the purge operation according to the first embodiment.

Specifically, a valve opening degree setting routine (step S403) is executed. As shown in the flowchart of FIG. 16, in the valve opening degree setting routine, the operation-time pressure Pa, which is the pressure P of the vapor-phase gas G at the operation time, is sensed with the pressure sensor 44 (step S421). Next, as shown in FIG. 9, the operation-time pressure Pa is compared with the pressure relationship map M1, and the operation-time valve opening start amount Ka, which is the valve opening start amount K0 that corresponds to this operation-time pressure Pa, is obtained from the pressure relationship map M1 (step S422).

Next, as shown in FIG. 7, the pressure P of the vapor-phase gas G and the target flow rate of the vapor-phase gas G flowing through the sealing valve 3 are compared with the flow rate relationship map M2, and the opening degree of the sealing valve 3, which is required to achieve the target flow rate, is determined (step S423). The target flow rate of the vapor-phase gas G, which flows through the sealing valve 3, is set to be a flow rate that is suitable for the control operation of the air-fuel ratio of the internal combustion engine 61. Next, as shown in FIG. 10, the valve opening degree command amount K1, which is set by the opening degree command unit 51, is determined as the corrected valve opening degree command amount K2, which is obtained by adding the operation-time valve opening start amount Ka to the valve opening degree command amount K1 that corresponds to the opening degree of the sealing valve 3 (step S424).

Furthermore, the concentration N of the evaporated fuel F1 in the vapor-phase gas G contained in the fuel tank 62 at the operation time is sensed with the concentration sensor 45 (step S425). Then, the target flow rate of the vapor-phase gas G is multiplied by the concentration N of the evaporated fuel F1 to compute the supply amount of the evaporated fuel F1 purged to the air intake pipe 611 per unit time (step S426).

Next, the corrected valve opening degree command amount K2 is transmitted from the opening degree command unit 51 to the stepping motor 35 of the sealing valve 3, and the sealing valve 3 is opened to open the vapor pipe 41 (step S404). Furthermore, the purge valve 43 is opened in response to the command outputted from the control device 5 to open the purge pipe 42 (step S405). Here, it should be noted that the sealing valve 3 may be opened to open the vapor pipe 41 after the purge valve 43 is opened to open the purge pipe 42. Furthermore, the on-off valve 23 may be opened to open the pressure release opening 213 of the canister 2 when the purge valve 43 is opened to open the purge pipe 42.

The flow rate of the vapor-phase gas G, which flows through the sealing valve 3 and the purge valve 43, is controlled to the target flow rate, and the vapor-phase gas G in the fuel tank 62 is purged to the air intake pipe 611 of the internal combustion engine 61 through the vapor pipe 41 and the purge pipe 42 (step S406). At this time, the gas in the fuel tank 62 flows to the air intake pipe 611 of the internal combustion engine 61 due to the difference between the pressure P, which is exerted by the vapor-phase gas G in the fuel tank 62, and the pressure in the air intake pipe 611.

Furthermore, in the purge operation 503, at the internal combustion engine 61 before the time of purging the vapor-phase gas G from the evaporated fuel processing device 1 to the air intake pipe 611, the injection fuel F2 is supplied from the fuel injection devices 63 to the internal combustion engine 61 such that the air-fuel ratio is controlled to the target air-fuel ratio by the control device 5 through the feedback control operation. Then, at the time of executing the purge operation 503, in the feedback control operation of the air-fuel ratio of the internal combustion engine 61 executed by the control device 5, the supply amount of the injection fuel F2 per unit time is determined in view of the supply amount of the evaporated fuel F1 per unit time before the time of sensing the mixing of the evaporated fuel F1 to the injection fuel F2 in the air intake pipe 611 with the air-fuel ratio sensor 614 as an increase in the amount of fuel in the air intake pipe 611 (step S407).

At this time, the supply amount of the injection fuel F2 per unit time is determined relative to the supply amount of the evaporated fuel F1 per unit time, which is set by taking the concentration N of the evaporated fuel F1 into account. Therefore, fluctuations in the supply amount of the fuel per unit time are less likely to occur at the time of controlling the air-fuel ratio. In this way, the time, which is required to adjust the air-fuel ratio of the internal combustion engine 61 to the target air-fuel ratio, can be reduced even at the time of executing the purge operation 503.

Next, the pressure P of the vapor-phase gas G is sensed with the pressure sensor 44 (step S408), and it is determined whether the pressure P of the vapor-phase gas G is reduced by a predetermined amount or more (step S409). When it is determined that the pressure P of the vapor-phase gas G is reduced by the predetermined amount or more, the valve opening degree setting routine (step S410) is executed once again.

Then at steps S421-S426, the opening degree of the sealing valve 3, which is required to achieve the target flow rate, is determined, and the supply amount of the evaporated fuel F1 to be purged to the air intake pipe 611 per unit time is computed. At this time, the opening degree of the sealing valve 3 is increased by the amount that corresponds to the amount of reduction in the pressure P of the vapor-phase gas G, so that the target flow rate of the vapor-phase gas G, which flows through the sealing valve 3, is maintained. Thereafter, the valve opening degree setting routine (step S410) is executed every time the pressure P of the vapor-phase gas G is reduced.

Furthermore, when the pressure P of the vapor-phase gas G is sensed with the pressure sensor 44, it is determined whether the pressure P of the vapor-phase gas G is reduced to the predetermined pressure or lower (step S411). When the pressure P of the vapor-phase gas G is reduced to the predetermined pressure or lower, the sealing valve 3 is closed to close the vapor pipe 41 (step S412). Furthermore, the purge valve 43 is closed to close the purge pipe 42 (step S413). In this way, the purge operation 503 is terminated, and the vapor-phase gas G generated in the fuel tank 62 is used in the combustion operation of the internal combustion engine 61.

(Other Structure of Control Device 5)

In the present embodiment, the flowcharts (FIGS. 11-16), in which the learning operation 504, the vapor operation 501, the canister purge operation 502 and the purge operation 503 are executed separately, are indicated. The execution of the learning operation 504 is not necessarily limited to the time before the execution of each of the operations 501, 502, 503 and may be continuously executed even after each of the operations 501, 502, 503. The learning operation 504 may be executed at any suitable timing in the middle of the sealing operation of the control device 5, in which the sealing valve 3 is closed to seal the fuel tank 62. Furthermore, the learning operation 504 may be executed during an interval between the vapor operation 501 and the canister purge operation 502, an interval between the canister purge operation 502 and the purge operation 503, and an interval between the canister purge operation 502 and the vapor operation 501.

Furthermore, each of the operations 501, 502, 503 may be executed before the time of forming the pressure relationship map M1 in the learning operation 504. In such a case, the opening degree correcting unit 54 may temporarily use an initial pressure relationship map M1 initially set in the control device 5 and may thereafter use a newly formed pressure relationship map M1 after the newly formed pressure relationship map M1 is formed by the learning operation 504. The pressure relationship map M1 may be suitably renewed every time the learning operation 504 is executed.
(Effects and Advantages)

The control device 5 of the evaporated fuel processing device 1 of the present embodiment is configured to adjust the opening degree of the sealing valve 3 based not only on the pressure P of the vapor-phase gas G sensed with the pressure sensor 44 but also on the concentration N of the evaporated fuel F1 in the vapor-phase gas G sensed with the concentration sensor 45 and thereby adjust the supply amount of the evaporated fuel F1 supplied to the air intake pipe 611 at the time of executing the purge operation, in which the vapor-phase gas G is purged from the fuel tank 62 to the air intake pipe 611 of the internal combustion engine 61. When the concentration N of the evaporated fuel F1 is known, the amount of substance, which is the supply amount of the evaporated fuel F1, is sensed, and this amount of substance is adjusted.

In this way, when the evaporated fuel F1 in the vapor-phase gas G contained in the fuel tank 62 is purged to the air intake pipe 611 of the internal combustion engine 61 in the purge operation 503, the supply amount of the injection fuel F2 supplied from the fuel injection devices 63 to the internal combustion engine 61 is determined by taking into account the supply amount of the evaporated fuel F1, in which the concentration N is taken into account. Therefore, the control device 5 can reduce the supply amount of the injection fuel F2 per unit time by the amount that corresponds to the supply amount of the evaporated fuel F1 per unit time, which serves as feedforward, before the time of receiving the feedback of the air-fuel ratio from, for example, the air-fuel ratio sensor 614 at the time of controlling the air-fuel ratio of the internal combustion engine 61. As a result, when the feedback control operation of the air-fuel ratio of the internal combustion engine 61 is executed by the control device 5, it is possible to avoid that a change in the concentration N of the evaporated fuel F1 acts as a disturbance.

Therefore, according to the evaporated fuel processing device 1 of the present embodiment, even when the purge operation 503 is performed, the time, which is required to adjust the air-fuel ratio of the internal combustion engine 61 to the target air-fuel ratio, is reduced.

Second Embodiment

Figure 17:
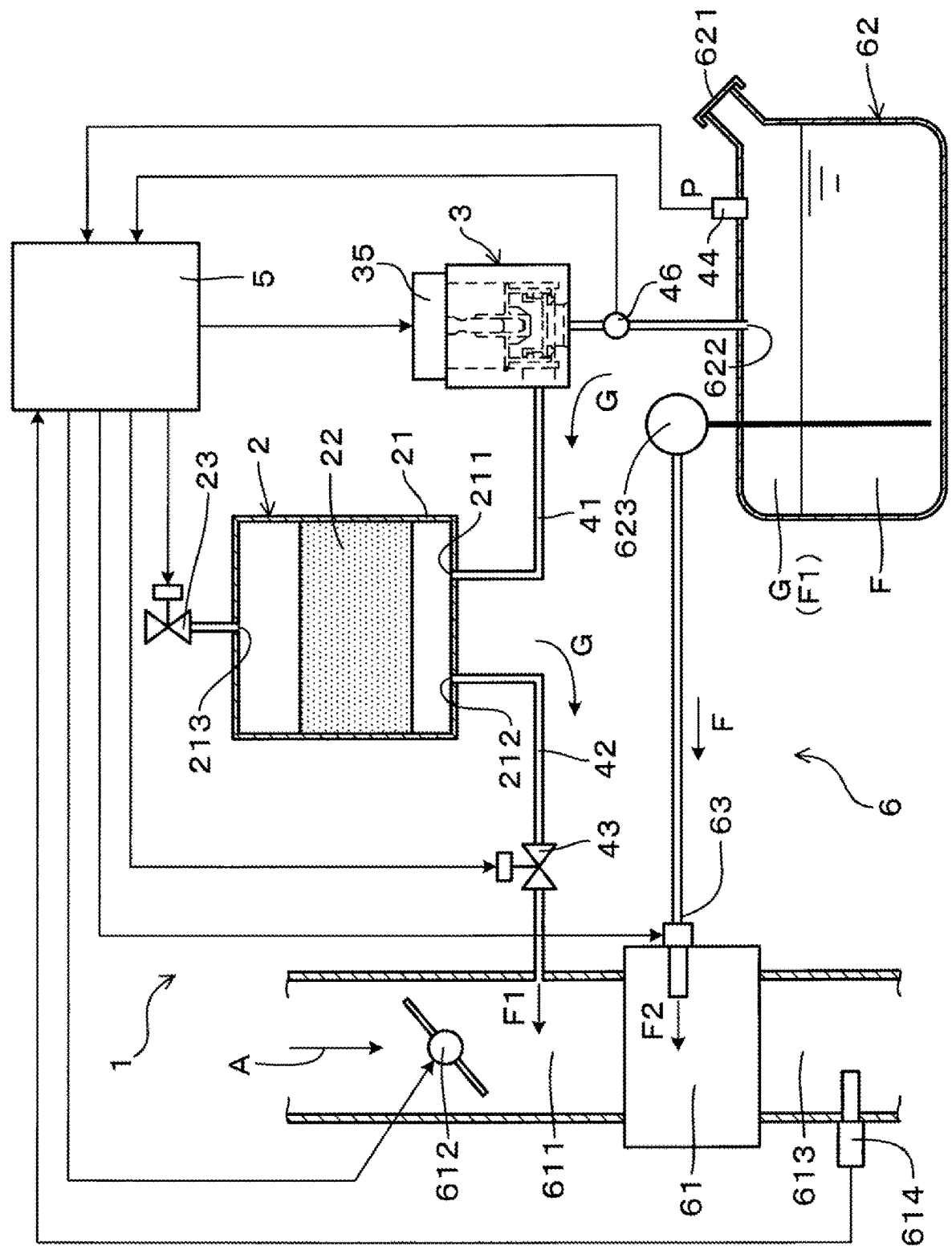
FIG. 17 is a descriptive diagram indicating a portion of the vehicle, at which an evaporated fuel processing device of a second embodiment is installed.

As shown in FIG. 17, the evaporated fuel processing device 1 of the present embodiment uses a flowmeter 46 instead of using the concentration sensor 45 indicated in the first embodiment. The flowmeter 46 is installed in the vapor pipe 41 at a location, which is located on a side of the sealing valve 3 where the fuel tank 62 is placed, such that the flowmeter 46 senses the flow rate of the vapor-phase gas G.

The control device 5 of the present embodiment is configured to adjust the supply amount of the evaporated fuel F1 supplied to the air intake pipe 611 based on the pressure P of the vapor-phase gas G, which is sensed with the pressure sensor 44, and the flow rate of the vapor-phase gas G, which is sensed with the flowmeter 46, at the time of executing the purge operation 503. At the time of executing the purge operation 503 of the present embodiment, the opening degree of the sealing valve 3, which is required to ensure the target flow rate of the vapor-phase gas G flowing through the sealing valve 3, is determined based on the flow rate relationship map M2 indicated in the first embodiment when the pressure P of the vapor-phase gas G is sensed.

Then, the flow rate of the vapor-phase gas G flowing through the sealing valve 3 is actually sensed at the time of executing the purge operation 503. Furthermore, the control device 5 obtains a density of the vapor-phase gas G based on the sensed pressure P of the vapor-phase gas G and the sensed flow rate of the vapor-phase gas G at the time of obtaining the supply amount of the evaporated fuel F1 to be purged to the air intake pipe 611 of the internal combustion engine 61 per unit time.

Specifically, the density of the vapor-phase gas G is obtained based on the pressure P of the vapor-phase gas G and the flow rate of the vapor-phase gas G according to Bernoulli's theorem. Bernoulli's theorem may be expressed by, for example, $Q = C \cdot A \cdot (2 \cdot P/\rho)^{1/2}$ where: Q [m$^3$/s] is the flow rate of the vapor-phase gas G; A [m$^2$] is the passage cross sectional area, which corresponds to the opening degree of the sealing valve 3; P [Pa] is the pressure P of the vapor-phase gas G; ρ [g/m$^3$] is the density of the vapor-phase gas G; and C is a discharge coefficient. The control device 5 can obtain the density ρ of the vapor-phase gas G by substituting values for Q, C, A and P.

Furthermore, the control device 5 obtains the concentration N of the evaporated fuel F1 in the vapor-phase gas G based on the density of the vapor-phase gas G and obtains the supply amount of the evaporated fuel F1 per unit time by multiplying the flow rate of the vapor-phase gas G by the concentration N of the evaporated fuel F1. The concentration N of the evaporated fuel F1 can be obtained through a relationship map that indicates the relationship between the concentration N of the evaporated fuel F1 and the density of the vapor-phase gas G.

The control device 5 of the evaporated fuel processing device 1 of the present embodiment is configured to adjust the opening degree of the sealing valve 3 based not only on the pressure P of the vapor-phase gas G sensed with the pressure sensor 44 but also on the flow rate of the vapor-phase gas G sensed with the flowmeter 46 and thereby adjust the supply amount of the evaporated fuel F1 supplied to the air intake pipe 611 at the time of executing the purge operation, in which the vapor-phase gas G is purged from the fuel tank 62 to the air intake pipe 611 of the internal combustion engine 61. When the flow rate of the vapor-phase gas G is known, the amount of substance, which is the supply amount of the evaporated fuel F1 per unit time, is sensed, and this amount of substance is adjusted.

As a result, similar to the first embodiment, when the feedback control operation of the air-fuel ratio of the internal combustion engine 61 is executed by the control device 5, it is possible to avoid that a change in the concentration N of the evaporated fuel F1 acts as a disturbance. Therefore, according to the evaporated fuel processing device 1 of the present embodiment, even when the purge operation 503 is performed, the time, which is required to adjust the air-fuel ratio of the internal combustion engine 61 to the target air-fuel ratio, is reduced.

The rest of the structure, the effects and the advantages of the evaporated fuel processing device 1 of the present embodiment are the same as those of the first embodiment. Also, in this embodiment, the components indicated by the same reference signs as those in the first embodiment are the same as those in the first embodiment.

The concentration sensor 45 of the first embodiment or the flowmeter 46 of the second embodiment can be provided to the fuel tank 62, the canister 2 or the purge pipe 42 besides the vapor pipe 41.

The present disclosure should not be limited to each of the above embodiments, and it is possible to configure further different embodiments without departing from the scope of the present disclosure. Furthermore, the present disclosure includes various modifications, modifications within an equivalent range, and the like. Furthermore, various combinations and forms of the constituent components of the embodiments are also included in the scope of the present disclosure.

The controller(s) and method(s) described in the present disclosure may be implemented by a special purpose computer created by configuring a memory and a processor programmed to execute one or more particular functions embodied in computer programs. Alternatively, the controller(s) and method(s) described in the present disclosure may be implemented by a special purpose computer created by configuring a processor provided by one or more special purpose hardware logic circuits. Alternatively, the controller(s) and method(s) described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. An evaporated fuel processing device configured to be installed to a vehicle having an internal combustion engine and a fuel tank and process evaporated fuel generated through evaporation of fuel in the fuel tank, comprising:
   a canister that includes an adsorbent, which is configured to adsorb the evaporated fuel;
   a sealing valve that is installed in a vapor pipe, which extends from the fuel tank to the canister, wherein the sealing valve is configured to open and close the vapor pipe, and the sealing valve is configured to be driven by an actuator to quantitatively adjust an opening degree of the sealing valve to adjust an opening degree of the vapor pipe;
   a pressure sensor that is installed at the fuel tank and is configured to sense a pressure of vapor-phase gas in the fuel tank;
   a purge valve that is installed in a purge pipe, which extends from the canister to an air intake pipe of the internal combustion engine, wherein the purge valve is configured to open and close the purge pipe;
   a concentration sensor that is installed to one of the fuel tank, the vapor pipe, the canister or the purge pipe, wherein the concentration sensor is configured to sense a concentration of the evaporated fuel in the vapor-phase gas; and
   at least one controller that is configured to execute:
      a sealing operation, in which the at least one controller closes the sealing valve to close the vapor pipe and thereby seal the fuel tank; and
      a purge operation, in which the at least one controller opens the sealing valve to open the vapor pipe and opens the purge valve to open the purge pipe, so that the vapor-phase gas in the fuel tank is purged to the air intake pipe while bypassing the adsorbent of the canister, wherein:
   the at least one controller is configured to adjust the opening degree of the sealing valve by controlling the actuator based on the pressure of the vapor-phase gas sensed with the pressure sensor and the concentration of the evaporated fuel in the vapor-phase gas sensed with the concentration sensor and thereby adjust a supply amount of the evaporated fuel supplied to the air intake pipe at a time of executing the purge operation.

2. The evaporated fuel processing device according to claim 1, wherein the at least one controller is configured to obtain the supply amount of the evaporated fuel by multiplying the concentration of the evaporated fuel by a flow rate of the vapor-phase gas that is determined based on the pressure of the vapor-gas and the opening degree of the sealing valve.

3. The evaporated fuel processing device according to claim 1, wherein the at least one controller is configured to set a set value of the supply amount of the fuel that is supplied to the internal combustion engine while the set value of the supply amount of the fuel is set to adjust an air-fuel ratio of the internal combustion engine to a target air-fuel ratio and is set as a total supply amount, which is a sum of a supply amount of injection fuel injected from at least one fuel injection device of the internal combustion engine and the supply amount of the evaporated fuel, at the time of executing the purge operation.

4. The evaporated fuel processing device according to claim 1, wherein the at least one controller is configured to execute:
   a vapor operation, in which the at least one controller opens the sealing valve to open the vapor pipe to purge the vapor-phase gas in the fuel tank to the canister; and
   a canister purge operation, in which the at least one controller opens the purge valve to open the purge pipe and thereby to purge a fuel component in the canister to the air intake pipe.

5. An evaporated fuel processing device configured to be installed to a vehicle having an internal combustion engine and a fuel tank and process evaporated fuel generated through evaporation of fuel in the fuel tank, comprising:
   a canister that includes an adsorbent, which is configured to adsorb the evaporated fuel;
   a sealing valve that is installed in a vapor pipe, which extends from the fuel tank to the canister, wherein the sealing valve is configured to open and close the vapor pipe, and the sealing valve is configured to be driven by an actuator to quantitatively adjust an opening degree of the sealing valve to adjust an opening degree of the vapor pipe;
   a pressure sensor that is installed at the fuel tank and is configured to sense a pressure of vapor-phase gas in the fuel tank;
   a purge valve that is installed in a purge pipe, which extends from the canister to an air intake pipe of the internal combustion engine, wherein the purge valve is configured to open and close the purge pipe;
   a flowmeter that is installed to one of the fuel tank, the vapor pipe, the canister or the purge pipe, wherein the flowmeter is configured to sense a flow rate of the vapor-phase gas in the one of the fuel tank, the vapor pipe, the canister or the purge pipe; and at least one controller that is configured to execute:

a sealing operation, in which the at least one controller closes the sealing valve to close the vapor pipe and thereby seal the fuel tank; and a purge operation, in which the at least one controller opens the sealing valve to open the vapor pipe and opens the purge valve to open the purge pipe, so that the vapor-phase gas in the fuel tank is purged to the air intake pipe while bypassing the adsorbent of the canister, wherein:

the at least one controller is configured to adjust the opening degree of the sealing valve by controlling the actuator based on the pressure of the vapor-phase gas sensed with the pressure sensor and the flow rate of the vapor-phase gas sensed with the flowmeter and thereby adjust a supply amount of the evaporated fuel supplied to the air intake pipe at a time of executing the purge operation.

6. The evaporated fuel processing device according to claim 5, wherein:

the at least one controller is configured to obtain a density of the vapor-phase gas based on the pressure of the vapor-phase gas sensed with the pressure sensor and the flow rate of the vapor-phase gas sensed with the flowmeter;

the at least one controller is configured to obtain a concentration of the evaporated fuel in the vapor-phase gas based on the density of the vapor-phase gas; and the at least one controller is configured to obtain the supply amount of the evaporated fuel by multiplying the concentration of the evaporated fuel by the flow rate of the vapor-phase gas.

7. The evaporated fuel processing device according to claim 5, wherein the at least one controller is configured to set a set value of the supply amount of the fuel that is supplied to the internal combustion engine while the set value of the supply amount of the fuel is set to adjust an air-fuel ratio of the internal combustion engine to a target air-fuel ratio and is set as a total supply amount, which is a sum of a supply amount of injection fuel injected from at least one fuel injection device of the internal combustion engine and the supply amount of the evaporated fuel, at the time of executing the purge operation.

8. The evaporated fuel processing device according to claim 5, wherein the at least one controller is configured to execute:

a vapor operation, in which the at least one controller opens the sealing valve to open the vapor pipe to purge the vapor-phase gas in the fuel tank to the canister; and a canister purge operation, in which the at least one controller opens the purge valve to open the purge pipe and thereby to purge a fuel component in the canister to the air intake pipe.

* * * * *